US011790387B2

(12) United States Patent
DeLuca

(10) Patent No.: US 11,790,387 B2
(45) Date of Patent: Oct. 17, 2023

(54) USER INTERFACE ADJUSTMENTS BASED ON INTERNET-OF-THINGS ENGAGEMENT

(71) Applicant: DoorDash, Inc., San Francisco, CA (US)

(72) Inventor: Lisa Seacat DeLuca, Baltimore, MD (US)

(73) Assignee: DoorDash, Inc., San Francisco, CA (US)

( * ) Notice: Subject to any disclaimer, the term of this patent is extended or adjusted under 35 U.S.C. 154(b) by 0 days.

(21) Appl. No.: 17/833,154

(22) Filed: Jun. 6, 2022

(65) Prior Publication Data

US 2022/0300997 A1 Sep. 22, 2022

Related U.S. Application Data

(63) Continuation of application No. 17/166,002, filed on Feb. 3, 2021, now abandoned, which is a continuation
(Continued)

(51) Int. Cl.
*G06Q 30/00* (2023.01)
*G06Q 30/0207* (2023.01)
(Continued)

(52) U.S. Cl.
CPC ..... *G06Q 30/0209* (2013.01); *G06F 3/04842* (2013.01); *G06F 9/451* (2018.02);
(Continued)

(58) Field of Classification Search
None
See application file for complete search history.

(56) References Cited

U.S. PATENT DOCUMENTS 7,911,346 B1 3/2011 Claudatos et al.
8,332,255 B2 12/2012 Chu
(Continued)

FOREIGN PATENT DOCUMENTS

CN 102594898 A 7/2012

OTHER PUBLICATIONS

STIC EIC 3600 Search Report for U.S. Appl. No. 16/171,766 dated Apr. 30, 2020 (Year: 2020).
(Continued)

*Primary Examiner* — Matthew T Sittner
(74) *Attorney, Agent, or Firm* — Kilpatrick Townsend & Stockton LLP

(57) ABSTRACT

A method, a computer program product, and a computer system. Activities of at least one customer with at least one tagged merchandise in possession of the at least one customer are monitored. The at least one tagged merchandise includes multiple Internet-of-Things (IoT) devices communicatively coupled over local communication channels to a central IoT hub which is communicatively coupled to an IoT service over the Internet. Each IoT device is designed for a particular application. The multiple IoT devices include respective multiple sensors with each sensor being particularized for the particular application of the IoT device that includes each sensor. The multiple IoT devices include a first IoT device that includes a first sensor configured to sense a type of interaction the at least one customer has with the at least one tagged merchandise to make a determination based on a gamification analysis of a qualifying event or a non-qualifying event.

20 Claims, 23 Drawing Sheets

Related U.S. Application Data of application No. 16/171,766, filed on Oct. 26, 2018, now Pat. No. 10,963,899.

(51) Int. Cl.
| | |
|---|---|
| *G06F 9/451* | (2018.01) |
| *G06Q 50/00* | (2012.01) |
| *G06F 3/04842* | (2022.01) |
| *G06Q 30/0238* | (2023.01) |
| *H04L 67/12* | (2022.01) |
| *G06F 3/04817* | (2022.01) |

(52) U.S. Cl.
CPC ..... *G06Q 30/0224* (2013.01); *G06Q 30/0238* (2013.01); *G06Q 50/01* (2013.01); *G06F 3/04817* (2013.01); *H04L 67/12* (2013.01)

(56) References Cited

U.S. PATENT DOCUMENTS

| | | | |
|---|---|---|---|
| 8,847,761 | B1 | 9/2014 | Claudatos et al. |
| 10,963,899 | B2 | 3/2021 | DeLuca |
| 2002/0116266 | A1* | 8/2002 | Marshall ............... G06Q 10/10 705/14.14 |
| 2005/0073417 | A1 | 4/2005 | Mathewson, II et al. |
| 2007/0069896 | A1 | 3/2007 | Boland et al. |
| 2008/0248781 | A1 | 10/2008 | Cedo Perpinya et al. |
| 2008/0249859 | A1 | 10/2008 | Angell et al. |
| 2009/0059175 | A1 | 3/2009 | Le Quesne et al. |
| 2009/0295534 | A1 | 12/2009 | Golander et al. |
| 2010/0106576 | A1* | 4/2010 | Etheredge ............... G06Q 30/02 235/375 |
| 2010/0145790 | A1 | 6/2010 | Brignull et al. |
| 2010/0318404 | A1* | 12/2010 | Jain ................... G06Q 30/0214 705/34 |
| 2012/0075101 | A1 | 3/2012 | Austin et al. |
| 2012/0166267 | A1 | 6/2012 | Beatty et al. |
| 2012/0259692 | A1* | 10/2012 | Monteverde ....... G06Q 30/0224 705/14.66 |
| 2013/0144700 | A1* | 6/2013 | VanDeburg ........ G06Q 30/0225 705/14.23 |
| 2014/0051506 | A1 | 2/2014 | Ameling et al. |
| 2014/0089143 | A1 | 3/2014 | Dione |
| 2014/0195272 | A1 | 7/2014 | Sadiq et al. |
| 2014/0229214 | A1 | 8/2014 | Bernier et al. |
| 2014/0310013 | A1 | 10/2014 | Ram et al. |
| 2015/0025967 | A1 | 1/2015 | Ellison |
| 2015/0081420 | A1* | 3/2015 | Min ................... G06Q 30/0244 705/14.43 |
| 2015/0134429 | A1 | 5/2015 | Katakawar et al. |
| 2015/0145671 | A1 | 5/2015 | Cohen |
| 2015/0199084 | A1* | 7/2015 | Velusamy ............. G06F 1/1696 715/716 |
| 2015/0262288 | A1 | 9/2015 | Cypher |
| 2016/0086121 | A1 | 3/2016 | Heilbrunn et al. |
| 2016/0086222 | A1 | 3/2016 | Kurapati |
| 2016/0093182 | A1 | 3/2016 | Turgeon et al. |
| 2016/0132216 | A1 | 5/2016 | Jardan |
| 2016/0379225 | A1* | 12/2016 | Rider ................. G06Q 30/0201 382/116 |
| 2017/0024790 | A1 | 1/2017 | Maggio |
| 2017/0068984 | A1 | 3/2017 | Joshi et al. |
| 2017/0116572 | A1 | 4/2017 | Natarajan et al. |
| 2017/0169264 | A1 | 6/2017 | Britt et al. |
| 2017/0256148 | A1 | 9/2017 | King et al. |
| 2017/0277365 | A1* | 9/2017 | Gaidar ............... G06Q 30/0631 |
| 2017/0352083 | A1* | 12/2017 | Ruck ...................... G06N 5/022 |
| 2017/0358175 | A1 | 12/2017 | Zimmerman |
| 2018/0032818 | A1 | 2/2018 | Abraham |
| 2018/0060901 | A1 | 3/2018 | Lyndon-James |
| 2018/0096331 | A1 | 4/2018 | Patil et al. |
| 2018/0210964 | A1 | 7/2018 | Esmailzadeh et al. |
| 2018/0211273 | A1* | 7/2018 | Dutta ....................... G06F 16/24 |
| 2018/0276692 | A1 | 9/2018 | Sequeira et al. |
| 2019/0019578 | A1 | 1/2019 | Vaccaro |
| 2019/0026781 | A1* | 1/2019 | Beck .................. G06Q 20/3224 |
| 2019/0188876 | A1 | 6/2019 | Song et al. |
| 2019/0220844 | A1 | 7/2019 | Trivelpiece et al. |
| 2019/0347635 | A1* | 11/2019 | Siedlecki ................ H04W 4/35 |
| 2020/0034863 | A1* | 1/2020 | Paisley ............. G06Q 30/0207 |
| 2020/0043308 | A1 | 2/2020 | Zhang et al. |
| 2020/0134652 | A1 | 4/2020 | Deluca |
| 2021/0158383 | A1 | 5/2021 | DeLuca |

OTHER PUBLICATIONS

Non-Final Office Action dated Oct. 22, 2021 for U.S. Appl. No. 17/166,002.
IP.com NPL Search Strategy (Year: 2021).
STIC EiC 3600 Search Report for parent U.S. Appl. No. 16/171,766 (similar claims) dated Apr. 30, 2020 (Year: 2021).
Mell et al., "The NIST Definition of Cloud Computing;" National Institute of Standards and Technology; Special Publication 800-145, Sep. 2011, 7 pages.
Non-Final Office Action dated Apr. 8, 2020 for U.S. Appl. No. 16/171,766, 28 pages.
Amendment filed Jul. 7, 2020 for U.S. Appl. No. 16/171,766, 62 pages.
Notice of Allowance dated Jul. 28, 2020 for U.S. Appl. No. 16/171,766, 11 pages.
RCE filed Oct. 22, 2020 for U.S. Appl. No. 16/171,766, 1 page.
Notice of Allowance dated Nov. 16, 2020 for U.S. Appl. No. 16/171,766, 12 pages.

* cited by examiner

USER INTERFACE ADJUSTMENTS BASED ON INTERNET-OF-THINGS ENGAGEMENT

This application is a continuation application of Ser. No. 17/166,002, filed Feb. 3, 2021, which is a continuation application claiming priority to Ser. No. 16/171,766, filed Oct. 26, 2018, now U.S. Pat. No. 10,963,899, which are all herein incorporated by reference in their entirety.

TECHNICAL FIELD

The present invention relates generally to the field of user interface generation, and more specifically to making adjustments to a user interface based on Internet-of-Things (IoT) engagement.

BACKGROUND

Retailers (e.g. clothing stores) may staff their changing and fitting rooms with an associate to help with engagement within the retail store. Often times those associates will push shoppers to try on additional pairings for upsell and cross sell opportunities. However, it may get frustrating for shoppers with a pushy associate. It would be of the benefit to both shoppers and retailers for shoppers to be able to try on more things while at the same time getting those shoppers to try on additional clothing in the hopes that they might have to have an unexpected item to increase their total spend associated with consumer satisfaction.

SUMMARY

Embodiments relate to a method, computer system, and/or computer program product for providing at least one merchandiser incentive to at least one customer. In embodiments, the presence of at least one tagged merchandise may be determined to be in possession of the at least one customer. Activities of the at least one customer with the at least one tagged merchandise may be monitored, in accordance with embodiments. In embodiments, based on a gamification analysis of the activities of the at least one customer, the at least one merchandiser incentive may be generated.

DETAILED DESCRIPTION

Figure 1A:
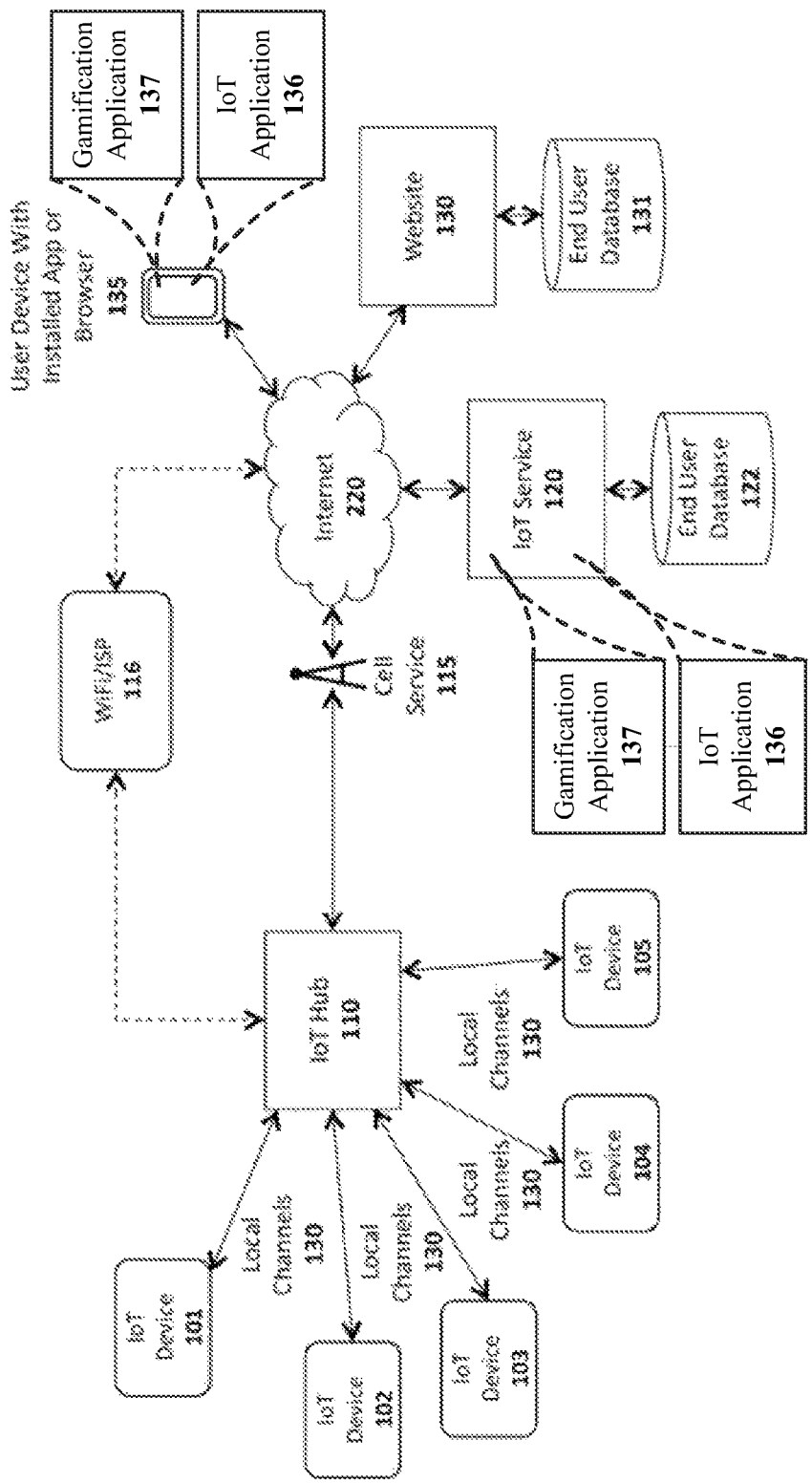
FIGS. 1A and 1B illustrates example IoT system architectures, in accordance with embodiments of the invention.

Embodiments relate to a program product, computer system and/or method to adjust the content of a user interface based on customer engagement with IoT sensors on products. In general, these adjustments are made based on a prediction that a given change or modification made to the user interface will encourage upsell of merchandise while rewarding loyal shoppers. Although example embodiments describe a physical retail store (e.g. a clothing store), embodiments relate to any environment or application where IoT devices may interact, in real-time or near to real-time, with users to leverage a pragmatic, desirable, efficient, or otherwise enhanced user experience. In example embodiments, a fitting room of a clothing store may be equipped with a virtual assistant as a user interface. In embodiments, the user interface may include smart speaker devices or applications which may not include a display. In embodiments, the user interface may include a graphical user interface (GUI) which may be modified in accordance with the present invention and denoted as a "modified GUI", Exemplary user interfaces may include Watson Assistant, Amazon Echo/Alexa, Google Home, etc., which interact with a user in relation to activity of IoT devices.

In embodiments, gamification is the application of game-design elements and game principles in non-game contexts. Gamification may employ game design elements to improve user engagement, organizational productivity, flow, learning, crowdsourcing, employee recruitment and evaluation, ease of use, usefulness of systems, physical exercise, traffic violations, voter apathy, and more.

For example, a customer in a clothing store may bring pieces of merchandise into a fitting room is tagged with an IoT device. Examples of IoT devices includes a device RFID tag, WiFi devices, bluetooth devices, or any other component attached to a piece of merchandise which can communicate with a surrounding communication network. In embodiments, IoT tags may include accelerometers technology to recognize activities of a user interacting with consumer merchandise. For example, in embodiments, a system may be able to determine the difference between just bringing an item into a fitting room versus, trying on the item in the fitting room, throwing the item in the air, or any other activity that can be determined using gamification analysis.

For example, a first user may bring a set of merchandise with them into a fitting room. A system, in accordance with embodiments, may recognize the presence of the tagged merchandise in the fitting room. As the user tries on different pieces of merchandise, the system may recognize the items as well as collect data about how long the user has kept those items on. A set of preferences of a merchandiser may be implemented for monitoring IoT sensor readings in fitting rooms such as, but are not limited to, a number of items tried on, time the user had the items on, category of items tried on, number of people in the dressing room, items returned to a store associate, requests for new sizes or colors, value of items, movement with items, or any other useful information.

For example, in embodiments, a system may only count a tagged item as having tried the item on if the user had them on for at least one minute. Embodiments relate to determinations of items tried on together (e.g. a pair of jeans with t-shirts). In embodiments, merchandise may be tracked as new merchandise: comes into the fitting room after an initial entry by a customer. In example embodiments, a system may determine total cost of the tried on merchandise if the customer were to purchase everything using threshold analysis (e.g. a $100 shopping cart triggers an incentive for a particular customer). In embodiments, movement of items may be used in gamification analysis. For example, if a customer spins around to check themselves in the mirror or jumps up and down while trying on clothing, gamification analysis may associate a consumer preference with those movements.

In embodiments, a merchandiser may pair real time IoT sensor reading data with an adjustment in promotional values. For example, a merchandiser may increase an offer with certain sensor events. In embodiments, a customer may be offered a discount depending on the number of items tried on. For example, using gamification analysis, a customer may be given an incentive "If you try on 5 items, get a 5% discount, if you try on 10 items, get a 7% discount." In some embodiments, a decrease offer value may be offered to a customer based on sensor events (e.g. if a total value of the items the user has in the dressing room is less than $100, then gamification analysis will determine that no promotion will be offered to a customer or an alert to the customer that an offer has decreased). Embodiments relate to unlocking discounts with sensor events (e.g. increase promotion when X shirt is tried on with Y pants). In embodiments, offers may be adjusted in combination with traditional events not related to IoT interaction using gamification analysis.

In embodiments, incentives from merchandisers to customer may be delivered using a mobile device push notification, an email promotion, a POS checkout coupon, a text message, a hand delivered promotional code from a store associate, and/or any other customer interface which can accomplish results of a gamification analysis.

In embodiments, gamification analysis may determine time of delivery of an incentive from a merchandiser to a customer. For example, an incentive may be delivered as the customer is leaving the fitting room, as the customer is getting in line to checkout, and/or any other timing that is determined as being beneficial by gamification analysis. In embodiments, depending on sensor interactions, pairing may be an urgent delivery request or increasing the number of items required for an incentive that is communicated to the customer at a time determined by gamification analysis to be a time right before a customer gets ready to check out.

In embodiments, a multipart event system may be used to implement a promotion or offer. For example, the system might provide a notification to incentivize certain actions by the consumer. As a particular example, a customer may receive a push notification after entering the dressing room that if they try on five pairs of jeans and buy two they'll get a second one free. After the first pair is tried on, they might see a text "1 out of 5 tried on, 4 more to get the discount". As additional user engagement with the merchandise in the fitting room changes, the promotions can be modified using gamification analysis, in accordance with embodiments.

In embodiments, gamification techniques are configured to leverage people's natural desires for socializing, learning, mastery, competition, achievement, status, self-expression, altruism, or closure, or simply their response to the framing of a situation as a game or play scenario (e.g. adding contexts of a game to the scenario). In embodiments, gamification strategies use rewards for users who accomplish desired tasks or competition to engage users. Types of rewards may include, but are not limited to, points, achievement badges or levels, the filling of a progress bar, or providing the user with virtual currency, in accordance with embodiments. Making the rewards for accomplishing tasks visible to other users or providing leader boards are ways of encouraging users to compete, in accordance with embodiments.

In embodiments, gamification may modify existing tasks with additional aspects such that the tasks encompass aspects and attributes associated with one or more games. Some techniques include, but are not limited to, adding meaningful choice to be made by the user, onboarding with a tutorial, increasing a level of challenge associated with a task, and adding narrative, in accordance with embodiments. Gamification may be applied to almost every aspect of life, in accordance with embodiments.

In embodiments, gamification may be used in an education system. For example, students may be ranked in their class based on their earned grade-point average (GPA), which is comparable to earning a high score in video games. Students may also receive incentives, such as an honorable mention on the dean's list, the honor roll, and scholarships, which are equivalent to leveling-up a video game character or earning virtual currency or tools that augment game success.

In embodiments, job application processes may use gamification as a way to hire employees by assessing their suitability through questionnaires and mini games that simulate the actual work environment of that company.

In embodiments, gamification may be used in marketing and customer retention. Gamification may be used in customer loyalty programs, in accordance with embodiments. For example, a retailer may offer discounts to people who checked in most frequently at an individual store.

In embodiments, gamification may be used as a tool for customer engagement, and for encouraging desirable website usage behavior. In embodiments, gamification may be used to increasing engagement on sites built on social network services. For example, a number of different badges may be available, and when a user's reputation points exceed various thresholds, the user gains additional privileges, possibly including moderator or administrator privileges.

In embodiments, gamification may be used for ideation (e.g. structured brainstorming to produce new ideas). For example, ideation games may help participants generate more and better ideas.

In embodiments, gamification may be used to encourage users to exercise more effectively and improve their overall health. Users may be awarded varying numbers of points for activities they perform in their workouts, and gain levels based on points collected. Users may also complete quests (e.g. sets of related activities) and gain achievement badges for fitness milestones. In embodiments, aspects of social gaming by allowing successful users to restore points to users who have failed to meet certain goals. In embodiments, gamification may be used in self-management of chronic diseases and common mental disorders, STD prevention, and infection prevention and control.

In embodiments, gamification may be used to improve employee productivity, healthcare, financial services, transportation, government, and others. In embodiments, enterprise gamification are work situations where game thinking and game-based tools are used in a strategic manner to integrate with existing business processes or information systems. In embodiments, enterprise gamification techniques may be to help drive positive employee and organizational outcomes. In embodiments, gamification application may improve employees' engagement, satisfaction, and retention. In embodiments, gamification may use included leveling (level advancement), badges, and scoring systems, as well as other game elements.

In embodiments, gamification may be used in corporate training to motivate employees to apply what they learned in the training to their job.

In embodiments, gamification has a player centered design. Based on the design methodology user-centered design, gamification may promote greater connectivity and positive behavior change between technological consumers, in accordance with embodiments.

In embodiments, gamification may be applied to authentication. For example, games may be a way to learn new and complicated passwords. In embodiments, gamification may be used to modify a password by increasing the length and types of characters included in the password at certain levels, thereby improving the strength of the password over time as levels are increased. In embodiments, gamification may be used to select and manage archives.

FIG. 1A illustrates an overview of an architectural platform on which embodiments of the invention may be implemented. In particular, the illustrated embodiment includes a plurality of IoT devices 101-105 communicatively coupled over local communication channels 130 to a central IoT hub 110 which is itself communicatively coupled to an IoT service 120 over the Internet 220. Each of the IoT devices 101-105 may initially be paired to the IoT hub 110 (e.g., using the pairing techniques described below) in order to enable each of the local communication channels 130.

The IoT devices 101-105 may be equipped with various types of sensors to collect information about themselves and their surroundings and provide the collected information to the IoT service 120, user devices 135 and/or external Websites 130 via the IoT hub 110, Some of the IoT devices 101-105 may perform a specified function in response to control commands sent through the IoT hub 110. Various specific examples of information collected by the IoT devices 101-105 and control commands are provided below. In embodiments, the IoT device 101 is a user input device designed to record user selections and send the user selections to the IoT service 120 and/or Website.

In embodiments, the IoT hub 110 includes a cellular radio to establish a connection to the Internet 220 via a cellular service 115 such as a 4G (e.g. Mobile WiMAX, LTE) or 5G cellular data service. Alternatively, or in addition, the IoT hub 110 may include a Wifi radio to establish a WiFi connection through a WiFi access point or router 116 which couples the IoT hub 110 to the Internet (e.g. via an Internet Service Provider providing Internet service to the end user). Of course, it should be noted that the underlying principles of embodiments are not limited to any particular type of communication channel or protocol.

In embodiments, the IoT devices 101-105 are ultra low power devices capable of operating for extended periods of time on battery power (e.g. years). To conserve power, the local communication channels 130 may be implemented using a low-power wireless communication technology such as Bluetooth Low Energy (LE). In this embodiment, each of the IoT devices 101-105 and the IoT hub 110 are equipped with Bluetooth LE radios and protocol stacks.

In embodiments, the IoT platform includes an IoT application 136 and/or a gamification application 137, which may include or be configured as a web application or other internet-based application, executed on user devices 135 to allow users to access and configure the connected IoT devices 101-105, IoT hub 110, and/or IoT service 120 and generate a modified user interface, in accordance with embodiments of the present invention. In embodiments, the application, web application, IoT application 136, and/or gamification application 137 may be designed by the operator of a Website 130 to provide IoT functionality to its user base. As illustrated, the Website may maintain a user database 131 containing account records related to each user.

In embodiments, application 136 and/or a gamification application 137 may be run on user device 135, IoT server 120, and/or anywhere else local or on a communication network. In embodiments, a gamification application 137 process some, all, or substantially all of the gamification analysis. In embodiments, gamification application 137 may be included in IoT application 136 and/or any other application local or on a communication network. In embodiments, a gamification application 137 may be stored on IoT Devices 101-105, which may be distributed to a user device 135 or IoT service 120 upon preconditions being met (e.g. a customer interfacing with an IoT tagged device.

Figure 1B:
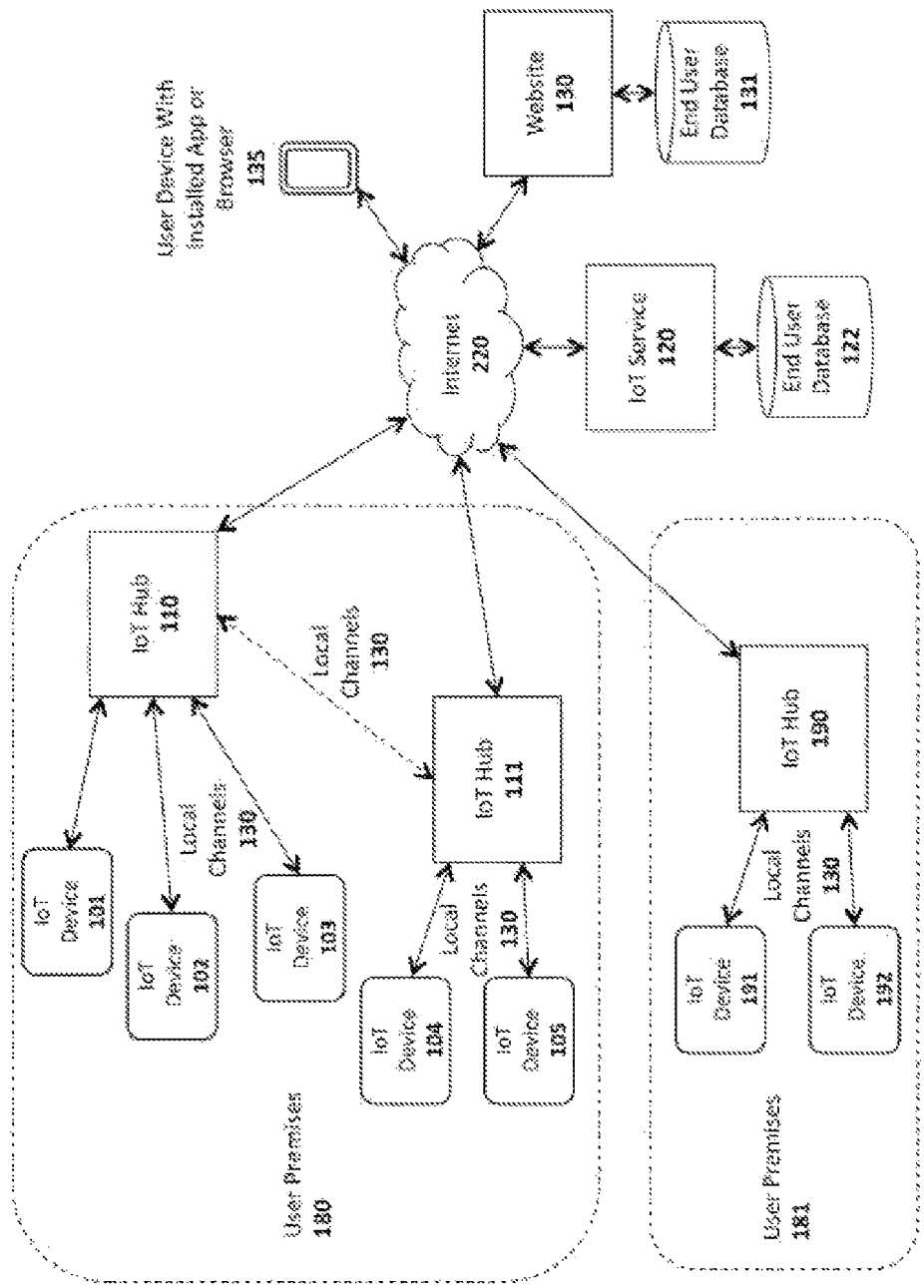

FIG. 1B illustrates additional connection options for a plurality of IoT hubs 110-111, 190, in accordance with embodiments. In embodiments, a single user may have multiple hubs 110-111 installed onsite at a single user premises 180 (e.g., the user's home or business). This may be done, for example, to extend the wireless range needed to connect all of the IoT devices 101-105. As indicated, if a user has multiple hubs 110, 111 they may be connected via a local communication channel (e.g. WiFi, Ethernet, Power Line Networking, etc). In embodiments, each of the hubs 110-111 may establish a direct connection to the IoT service 120 through a cellular 115 or WiFi 116 connection (not explicitly shown in FIG. 1B). Alternatively, or in addition, one of the IoT hubs such as IoT hub 110 may act as a "master" hub which provides connectivity and/or local services to all of the other IoT hubs on the user premises 180, such as IoT hub 111 (as indicated by the dotted line connecting IoT hub 110 and IoT hub 111). For example, the master IoT hub 110 may be the only IoT hub to establish a direct connection to the IoT service 120. In embodiments, only the "master" IoT hub 110 is equipped with a cellular communication interface to establish the connection to the IoT service 120. As such, all communication between the IoT service 120 and the other IoT hubs 111 will flow through the master IoT hub 110. In this role, the master IoT hub 110 may be provided with additional program code to perform filtering operations on the data exchanged between the other IoT hubs 111 and IoT service 120 (e.g. servicing some data requests locally when possible).

Regardless of how the IoT hubs 110-111 are connected, in embodiments, the IoT service 120 will logically associate the hubs with the user and combine all of the attached IoT devices 101-105 under a single comprehensive user interface, accessible via a user device with the installed app 135 (and/or a browser-based interface).

In embodiments, the master IoT hub 110 and one or more slave IoT hubs 111 my connect over a local network which may be a WiFi network 116, an Ethernet network, and/or a using power-line communications (PLC) networking (e.g. where all or portions of the network are run through the user's power lines). In addition, to the IoT hubs 110-111, each of the IoT devices 101-105 may be interconnected with the IoT hubs 110-111 using any type of local network channel such as WiFi, Ethernet, PLC, or Bluetooth LE, to name a few.

FIG. 1B also shows an IoT hub 190 installed at a second user premises 181, in accordance with embodiments. A virtually unlimited number of such IoT hubs 190 may be installed and configured to collect data from IoT devices 191-192 at user premises around the world. In embodiments, the two user premises 180-181 may be configured for the same user. For example, one user premises 180 may be the user's primary home and the other user premises 181 may be the user's vacation home. In such a case, the IoT service 120 will logically associate the IoT hubs 110-111, 190 with the user and combine all of the attached IoT devices 101-105, 191-192 under a single comprehensive user interface, accessible via a user device with the installed app 135 (and/or a browser-based interface).

Figure 2:
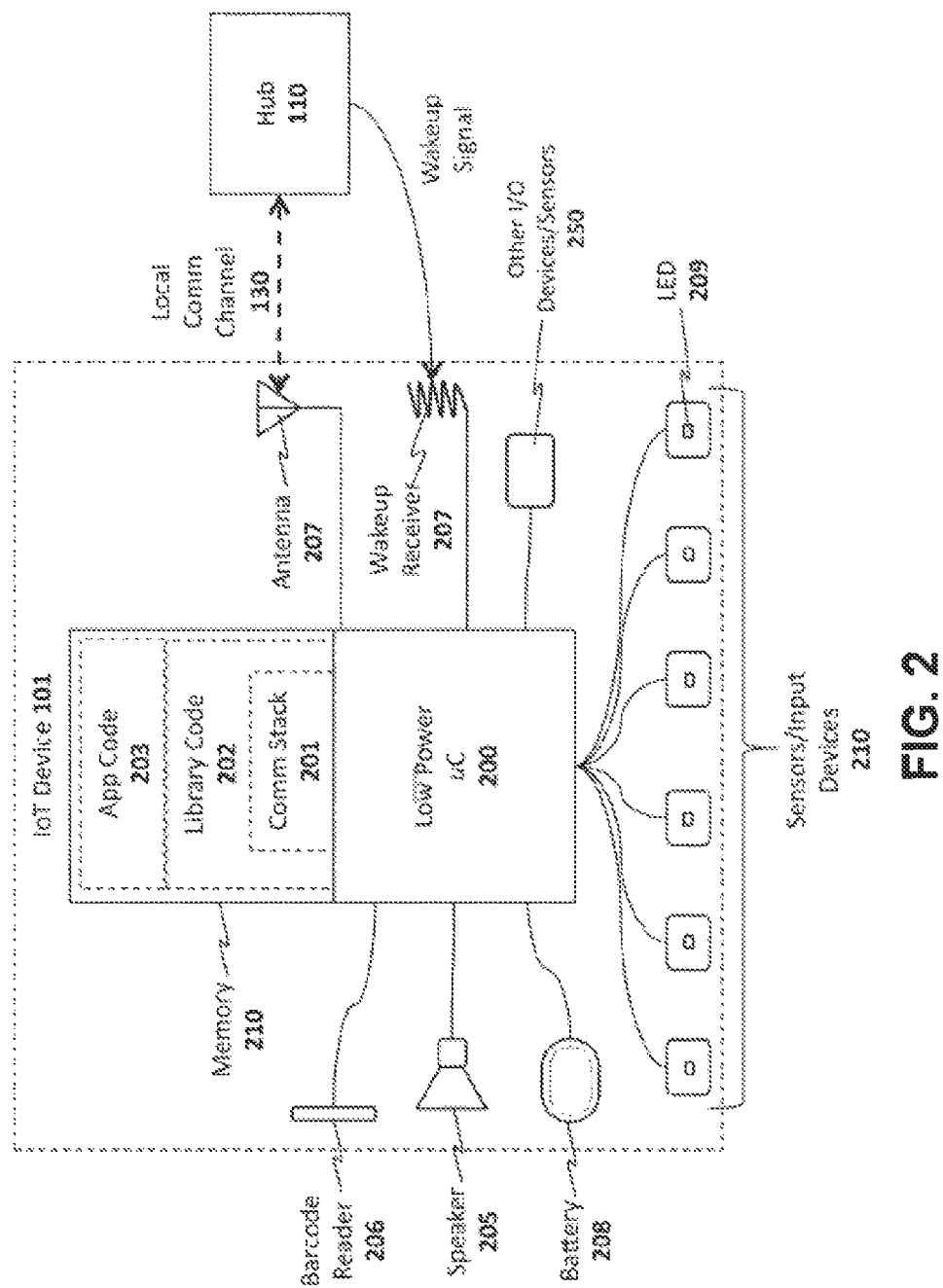
FIG. 2 illustrates an example IoT device, in accordance with embodiments of the invention.

As illustrated in FIG. 2, an exemplary embodiment of an IoT device 101 includes a memory 210 for storing program code and data 201-203 and a low power microcontroller 200 for executing the program code and processing the data. The memory 210 may be a volatile memory such as dynamic random access memory (DRAM) or may be a non-volatile memory such as Flash memory. In embodiments, a non-volatile memory may be used for persistent storage and a volatile memory may be used for execution of the program code and data at runtime. Moreover, the memory 210 may be integrated within the low power microcontroller 200 or may be coupled to the low power microcontroller 200 via a bus or communication fabric. The underlying principles of embodiments are not limited to any particular implementation of the memory 210.

As illustrated, the program code may include application program code 203 defining an application-specific set of functions to be performed by the IoT device 201 and library code 202 comprising a set of predefined building blocks which may be utilized by the application developer of the IoT device 101. In embodiments, the library code 202 comprises a set of basic functions required to implement an IoT device such as a communication protocol stack 201 for enabling communication between each IoT device 101 and the IoT hub 110. In embodiments, the communication protocol stack 201 comprises a Bluetooth LE protocol stack. In embodiments, Bluetooth LE radio and antenna 207 may be integrated within the low power microcontroller 200. However, the underlying principles of embodiments are not limited to any particular communication protocol.

Embodiments illustrated in FIG. 2 may include a plurality of input devices or sensors 210 to receive user input and provide the user input to the low power microcontroller, which processes the user input in accordance with the application code 203 and library code 202. In embodiments, each of the input devices include an LED 209 to provide feedback to the end user.

Embodiments include a battery 208 for supplying power to the low power microcontroller. In embodiments, a non-chargeable coin cell battery may be used. In embodiments, an integrated rechargeable battery may be used (e.g. rechargeable by connecting the IoT device to an AC power supply).

A speaker 205 may be provided for generating audio. In embodiments, the low power microcontroller 299 includes audio decoding logic for decoding a compressed audio stream (e.g. such as an MPEG-4/Advanced Audio Coding (AAC) stream) to generate audio on the speaker 205. Alternatively, the low power microcontroller 200 and/or the application code/data, 203 may include digitally sampled snippets of audio to provide verbal feedback to the end user as the user enters selections via the input devices 210.

In embodiments, one or more other/alternate I/O devices or sensors 250 may be included on the IoT device 101 based on the particular application for which the IoT device 101 is designed. For example, an environmental sensor may be included to measure temperature, pressure, humidity, etc. A security sensor and/or door lock opener may be included if the IoT device is used as a security device. Of course, these examples are provided merely for the purposes of illustration. The underlying principles of embodiments are not limited to any particular type of IoT device. In fact, given the highly programmable nature of the low power microcontroller 200 equipped with the library code 202, an application developer may readily develop new application code 203 and new I/O devices 250 to interface with the low power microcontroller for virtually any type of IoT application.

Figure 3:
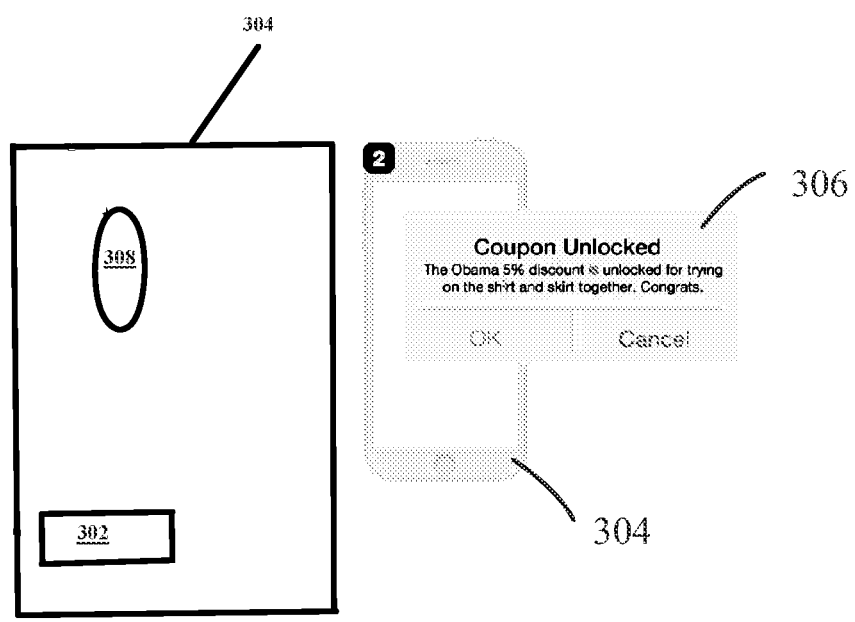
FIG. 3 illustrates an example customer interacting with tagged merchandise, in accordance with embodiments of the invention.

FIG. 3 illustrates an example customer 308 interacting with tagged merchandise 302, in accordance with embodiments of the invention. In embodiments, a customer 308 may be in a fitting room in a clothing store with tagged merchandise 302. The customer 308 may be interfacing with a user interface 304. In this illustrative example, in accordance with embodiments, the user interface 304 is a mobile phone. However, in accordance with embodiments, user interface 304 may be any user interface device or system that a user can interact with while also physically interfacing with the IoT tagged merchandise 302.

In example embodiments, rumors may have spread (e.g. social media or other communications) that a celebrity has frequented a given merchandiser. Based on the celebrity's association with the given merchandiser, the store has been growing in popularity. The store and brand lead for the given merchandiser suggest running a promotion that builds off of the celebrity sighting. She suggests that anyone who tries on the same blouse and skirt that the celebrity was seen in should be given a 5% discount off their entire order, as show in message 306 on user interface 304.

In embodiments, a store may be equipped with IoT sensors within the dressing room. Through implementation of gamification analysis, shoppers may be able to take advantage of the incentive offers based on the tagged merchandise 302 that they bring with them into the fitting room. A customer may be excited about an incentive provided through gamification of their shopping experience, in accordance with embodiments. For example, a customer may hear the news and brings in the exact blouse and skirt into a store. She tries on the skirt with the shirt she wore to the store and nothing happens. No new offer sent to her phone. She puts on the shirt while wearing the skirt and immediately gets a push notification on her phone about the extra 5% discount.

In embodiments, a method is implemented in at least one of a physical retail store, a grocery store, a warehouse, an auction, a wholesaler, on a fishing boat, and/or any other environment where the gamification of user's interactions with objects provide utility, efficiency, and/or any other advantage.

In embodiments, a physical retail store may include fitting rooms that include at least one virtual assistant. The at least one virtual assistant may be, but are not limited to, a Watson Assistant, an Amazon Echo, an Amazon Alexa, a Google home, an AI system or service, or any other mechanism where the gamification of user's interactions with objects provide utility, deficiency, and/or any other advantage.

In embodiments, a tagged merchandise may be a RFID tag, a bar code, an accelerometer, a Bluetooth device, a tagging system, or any other physical object where the gamification of user's interactions with the physical object provide utility, efficiency, and/or any other advantage.

In embodiments, a merchandiser incentive is delivered to a customer by a mobile device push notification, an email promotion, a POS checkout coupon, a text message, a hand delivered promotional code from a store associate, a notification to a customer after the customer leaves a fitting room, a notification to a customer getting in line to checkout, and/or any other delivery mechanism that provides utility, efficiency, and/or any other advantage.

In embodiments, a merchandiser incentive is delivered to a customer as an urgent delivery request based on a sensor event of the at least one tagged merchandise. In embodiments, an urgent delivery request promotes an increase in a number of items of the plurality of tagged items with the at least one customer immediately prior to the at least one customer checking out.

Figure 4:
FIGS. 4-6 illustrate an example generated merchandiser incentive, in accordance with embodiments of the invention.
Figure 5:
Figure 6:

FIGS. 4-6 illustrate an example generated merchandiser incentive, in accordance with embodiments of the invention.

In this example, as shown in FIG. 4, a customer 308 may hear rumors that if the customer 308 tries on twenty items at a certain store they will get a free holiday sweater. The customer 308 grabs twenty items 302 off the nearest rack and brings them into a fitting room. But the customer 308 does not receive an offer. The customer 308 tries on one of the items and nothing happens. The customer 308 tries on another item 302, but this time, based on gamification analysis, the customer 308 gets a push notification 310 on her 304 phone that says "Shh, if you try on 20 items you'll get a free holiday sweater. You've tried on 2, 18 to go".

In embodiments, the customer 308, based on gamification analysis may not realize the system was smart enough to know when the customer 308 had tried on the items 302 or the customer 308 had just brought the items 302 into the changing room. The customer 308 tries just throwing items 302 in the air in an attempt to activate accelerometers in the IoT tagged merchandise 302. In embodiments, gamification analysis may determine the difference between items 302 being tried on versus just thrown in the air or other attempt to circumvent the incentive requirements. In embodiments, through gamification analysis, a customer 308 may realize that the incentive cannot be easily circumvented or cheated and therefore actually trying items 302 on (e.g. thus promoting sales). Such gamification analysis may prompt the customer 308 to interface with a store associate to bring the customer 308 some things that the customer 308 actually can fit into, thus allowing the store associate to be helpful in promoting sales without presuming an uncomfortable role as a pusher.

As illustrated in the example embodiment of FIG. 5, after trying on the 20th item the customer 308 receives the notification 312 on a user interface 304 that the customer 308 has gotten the free holiday sweater. Hopefully, in embodiments, the customer also unexpectedly liked a few things they did not plan on purchasing and goes ahead and buys them, thus increasing both consumer and retailer experiences.

As illustrated in the example embodiment of FIG. 6, a customer 308 may try on an item of clothing 302 and be satisfied with the selection which causes the customer to express their excitement. For example, in embodiments, customer excitement may be determined based on physical sensing motions of the customer (e.g. jumping up and down), facial expressions, vocal utterances, body language, or any other interaction with the tagged items 302 that is useful input data in gamification analysis. Based on gamification analysis, in accordance with embodiments, the customer may receive an alert 314 on the user interface 304 stating "We're excited you're excited, enjoy $5 off today only". Alternatively, a promotional and offer messaging may be modified to include information about the merchandise. For example, in the case of the excited shopper, the offer might say "We're excited you love our jackets, enjoy $5 off today only." This would be possible as the IoT sensor data can share with the server information about the merchandise currently engaged with by the customer.

Figure 7:
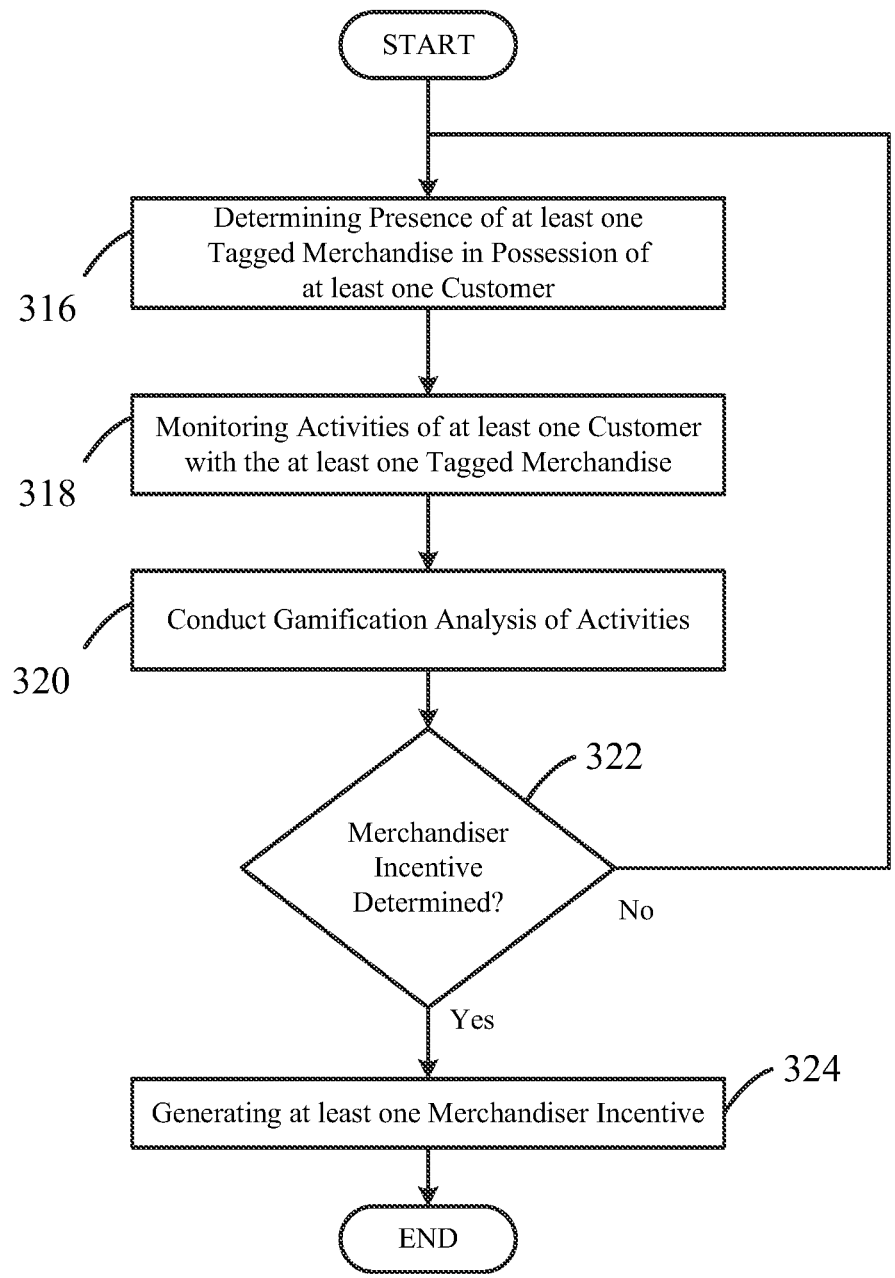
FIG. 7 is a flow chart which illustrates an example process of generating a merchandiser incentive to be transmitted to a user interface based on gamification analysis, in accordance with embodiments of the invention.

FIG. 7 is a flow chart that illustrates an example process of generating a merchandiser incentive to be transmitted to a user interface based on gamification analysis, in accordance with embodiments of the invention. In step 316, a process may determine presence of at least one tagged merchandise in possession of at least one customer. After step 316, at step 318, activities of the at least one customer with the at least one tagged merchandise may be monitored. After step 318, at step 320, gamification analysis may be conducted of activities. After step 320, at decision 322, it may be determined based on gamification analysis if a merchandiser incentive will be offer to a customer. If at decision 322 it is determined that a merchandiser incentive will not be offered, then the process may return to step 316. If at decision 322 it is determined through gamification analysis that a merchandiser incentive will be offered to a customer, then at step 324 generating at least one merchandiser incentive to be transmitted to a user interface. In embodiments, disclosed step and/or decisions may be omitted, modified, include sub-steps to implement gamification analysis in relation to activating with tagged IoT devices.

Embodiments relate to a method of providing at least one merchandiser incentive to at least one customer by generating a modified GUI. Embodiments may include determining the presence of at least one tagged merchandise in possession of the at least one customer. Embodiments may include monitoring activities of the at least one customer with the at least one tagged merchandise. Embodiments may include, based on a gamification analysis of the activities of the at least one customer, generating the at least one merchandiser incentive to be transmitted to a user interface.

In embodiments, gamification analysis includes, but is not limited to, analysis of a predicted response of a user to at least one of game design elements, game principles, or player centered design that may be added to non-game contexts by addition of the at least one merchandiser incentive to a user interface.

In embodiments, gamification analysis includes employment of the game design elements that are predicted to increase the at least one customer's engagement with the at least one tagged merchandise in relation to the at least one merchandiser incentive.

In embodiments, gamification analysis includes leveraging the at least one customer's predicted desires to generate a user interface. In some embodiments and scenarios, content used to generate the user interface is selected based on the at least one customer's predicted desires for at least one of socializing, learning, mastery, competition, achievement, status, self-expression, altruism, closure, or the at least one customer's response to the framing of a gamified situation. In some embodiments, content used to manipulate a user interface (e.g. a modified. GUI) is selected based on a matching between the at least one merchandiser incentive and the at least one customer's predicted desires.

For example, a customer may walk through a clothing store and touch several sweaters on display. Gamification analysis, in accordance with embodiments, may associate this touching of sweaters (e.g. sensed by IoT devices) as a customer's desire to buy a sweater. Based on the gamification analysis, a merchandiser incentive may be generated that offers a discount for trying on a certain number of sweaters. Since the customer is presumably browsing sweaters in a store because they are open minded about buying a sweater, it may be deduced by gamification analysis that the customer will both try on sweaters and may purchase at least one of them.

In embodiments, gamification analysis includes determining a reward to present to the at least one customer along with or including the at least one merchandiser incentive for accomplishing tasks. In some embodiments, the reward is determined, in part, based on a prediction of incentivizing competition between a plurality of customers in relation to the at least one merchandiser incentive.

In embodiments, gamification analysis includes selecting rewards for the accomplishing tasks, which can be made visible to a plurality of the plurality of customers to encourage the at least one customer to compete in relation to the at least one merchandiser incentive.

In embodiments, gamification analysis includes selecting one or more incentives that are predicted to encourage the at least one customer to complete quests. In some embodiments, a given quest is determined to be completed by the performance of one or more sets of activities in relation to the at least one merchandiser incentive.

In embodiments, at least one tagged merchandise comprises at least one IoT device. In embodiments, tagged merchandise may include at least one sensor configured to sense a type of interaction the at least one customer has with the at least one tagged merchandise to make a determination of a qualifying event or a non-qualifying event. In embodiments, the at least one senor comprises at least one accelerometer.

Figure 8A:
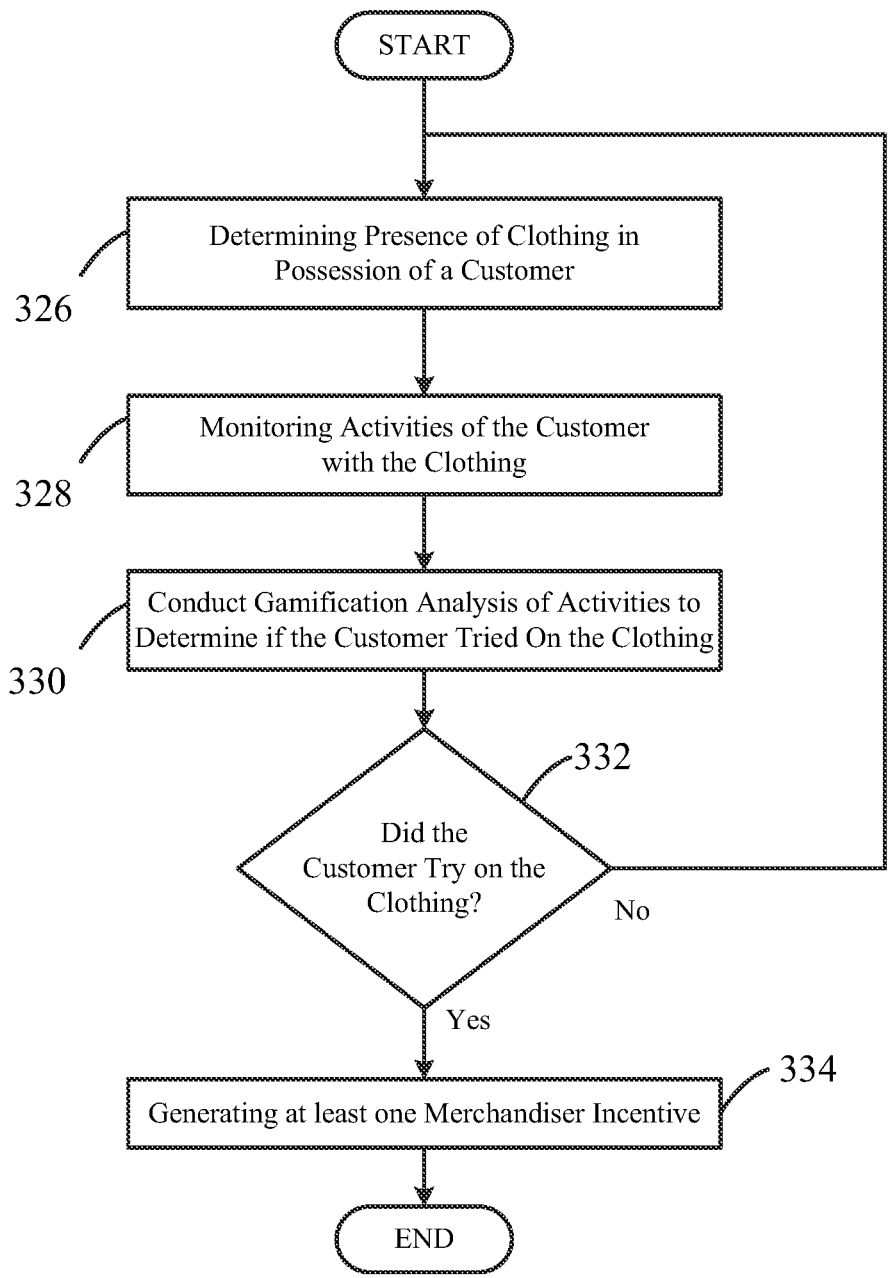
FIGS. 8A and 8B are flow charts which illustrate example processes of generating merchandizer incentives to be transmitted to a user interface based on gamification analysis of customer interaction with tagged merchandise, in accordance with embodiments of the invention.
Figure 8B:
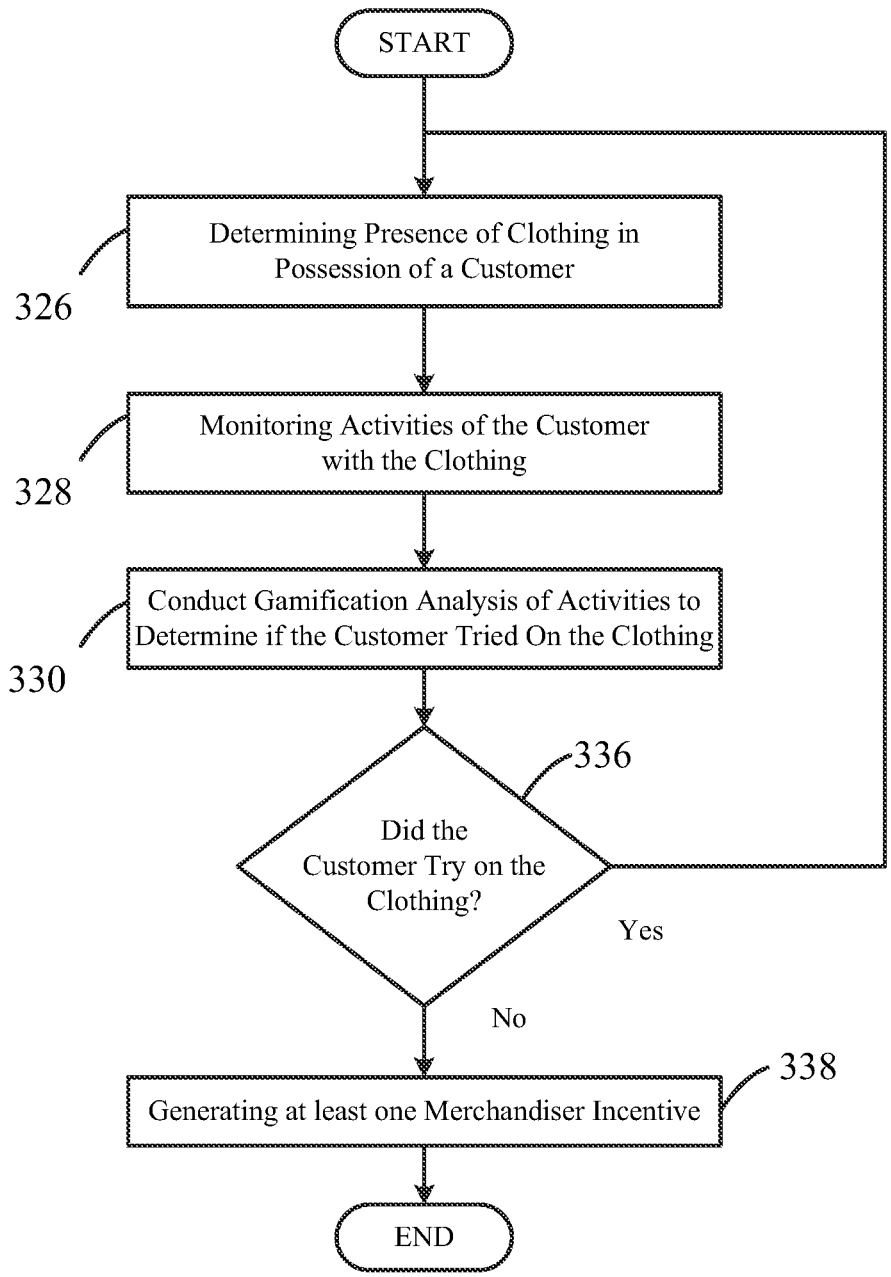

FIGS. 8A and 8B are flow charts that illustrate example processes of generating merchandizer incentives to be transmitted to a user interface based on gamification analysis of customer interaction with tagged merchandise, in accordance with embodiments of the invention.

As illustrated in example flow chart FIG. 8A, in embodiments, in response to the qualifying event or in combination with other qualifying events associated with the at least one tagged merchandise, generating the at least one merchandiser incentive to be transmitted to a user interface. At step 326, presence of clothing in possession of a customer may be detected. After step 326, at step 328, activities of the customer with the clothing may be monitored. After step 328, at step 330, gamification analysis of activities to determine if the customer tried on the clothing may be conducted. After step 330, at decision 332, it may be determined if the customer tried on the clothing. If at decision 332 it is determined that the customer did not try on the clothing, the process returns to step 326. If at decision 332 it is determined that that customer did try on the clothing, then the process proceeds to step 334 with at least one merchandiser incentive being generated to be transmitted to a user interface. In embodiments, disclosed step and/or decisions may be omitted, modified, include sub-steps to implement gamification analysis.

In embodiments, a method is implemented in a clothing store. At least one tagged merchandise may be clothing. In embodiments, a method includes making a determination of the qualifying event if the type of interaction between the at least one customer and the at least one tagged merchandise is the at least one customer trying on the at least one tagged merchandise.

As illustrated in example flow chart FIG. 8B, in embodiments, making a determination of the non-qualifying event if the type of interaction between the at least one customer and the at least one tagged merchandise is not the customer trying on the tagged merchandise. In embodiments, in response to the non-qualifying event refraining from generating the merchandiser incentive to be transmitted to a user interface, in accordance with embodiments.

For example, at step 326, presence of clothing in possession of a customer may be determined. After step 326, at step 328, activities of the customer may be monitored. After step 328, at step 330, gamification analysis of activities to determine if the customer tried on the clothing is conducted. After step 330, at decision 332, it may be determined if the customer tried on the clothing. If at decision 336 it is determined that a customer did try on the clothing, then the process may return to step 326. If at decision 336 it is determined that the customer did not try on the clothing, then the process continues to step 338 where at least one merchandiser incentive is generated. In embodiments, disclosed step and/or decisions may be omitted, modified, include sub-steps to implement gamification analysis.

In embodiments, the types of interactions at least one customer has with at least one tagged merchandise as the qualifying event may include spinning, jumping up and down, human motion associated with a consumer preference, and/or any other interaction which provides data for a gamification analysis.

In embodiments, the types of interactions at least one customer has with at least one tagged merchandise as the non-qualifying event includes an attempt to cheat the system, the at least one tagged merchandise includes clothing and the non-qualifying event comprising throwing the clothing up in the air, and/or any other human motion associated with a consumer preference that may be used in gamification analysis.

Figure 9:
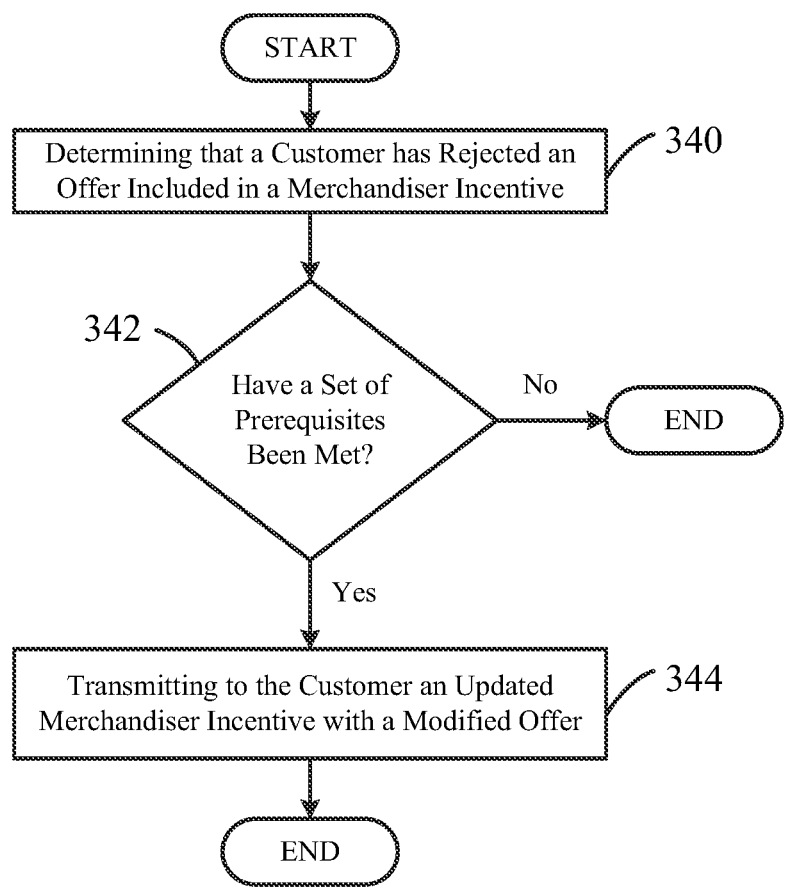
FIG. 9 is a flow chart which illustrates an example process of transmitting an updated merchandiser incentive to be transmitted to a user interface if preconditions have been met, in accordance with embodiments.

FIG. 9 is a flow chart that illustrates an example process of transmitting an updated merchandiser incentive to a user interface if preconditions have been met, in accordance with embodiments. For example, at step 340, it may be determined if a customer has rejected an offer included in a merchandiser incentive. After step 340, at decision 342, it may be determined if a set of prerequisites have been met.

If at decision 342 it is determined that a set of prerequisites have not been met, then the process may end. If at decision 342 it is determined that the set of prerequisites have been met, then the process may continue to step 344 to transmit to the customer an updated merchandiser incentive with a modified offer. In embodiments, disclosed step and/or decisions may be omitted, modified, include sub-steps to implement gamification analysis.

In embodiments, at least one merchandiser incentive is generated based on attributes including historical purchases made by the at least one customer, a determination of whether the at least one customer viewed a price of the at least one tagged merchandise, changes in one or both of facial expression and body language of the at least one customer, a multi-part event that if engaged by the at least one customer will result in the at least one merchandiser incentive, and/or any other data that may be used in gamification analysis.

Figure 10A:
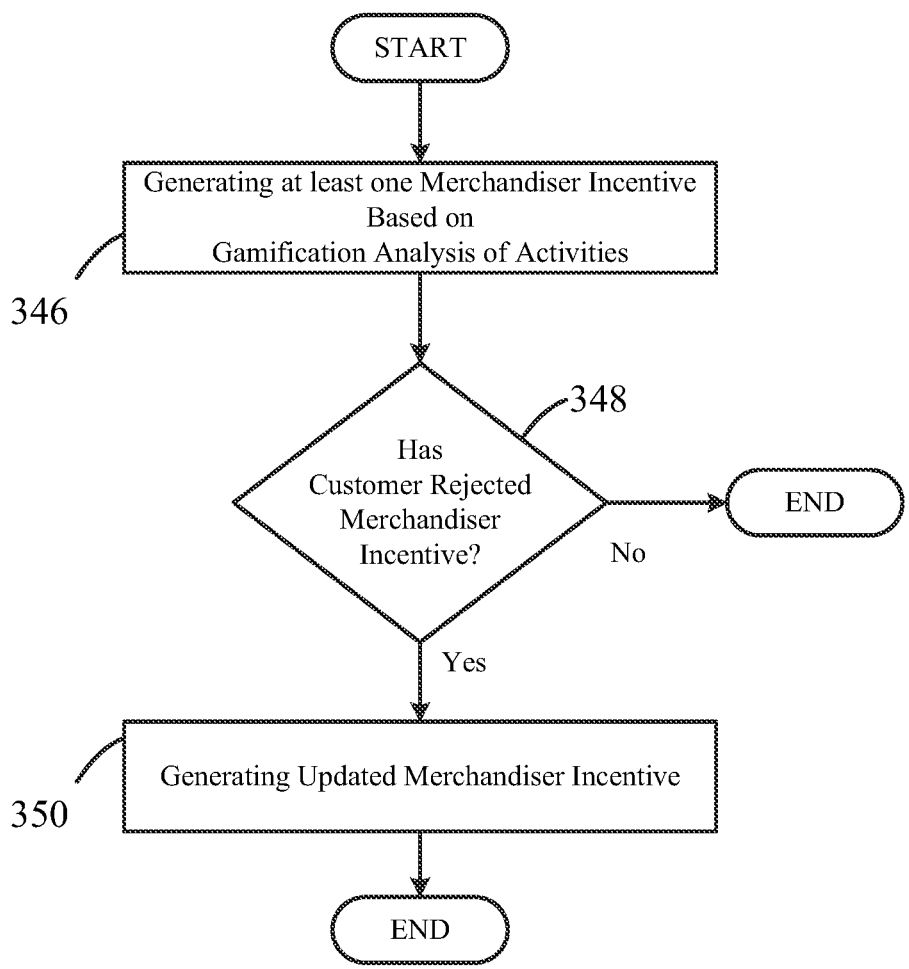
FIGS. 10A and 10B are flow charts which illustrate example processes of generated updated merchandiser incentives to be transmitted to a user interface if a customer has rejected an original merchandiser incentive at the user interface, in accordance with embodiments.

FIG. 10A is a flow chart that illustrates an example process of generated updated merchandiser incentives if a customer has rejected an original merchandiser incentive, in accordance with embodiments. For example, at step 346, at least one merchandiser incentive to be transmitted to a user interface may be generated based on gamification analysis of activities. After step 346, at decision 348 it may be determined if a customer has rejected a merchandiser incentive at a user interface. If at decision 348 it is determined that a customer has not rejected a merchandiser incentive at a user interface, then the process may end. If at decision 348 it is determined that a customer has rejected a merchandiser incentive at a user interface, then the process may continue to step 350 to generate an updated merchandiser incentive. In embodiments, disclosed steps and/or decisions may be omitted, modified, include sub-steps to implement gamification analysis.

Figure 10B:
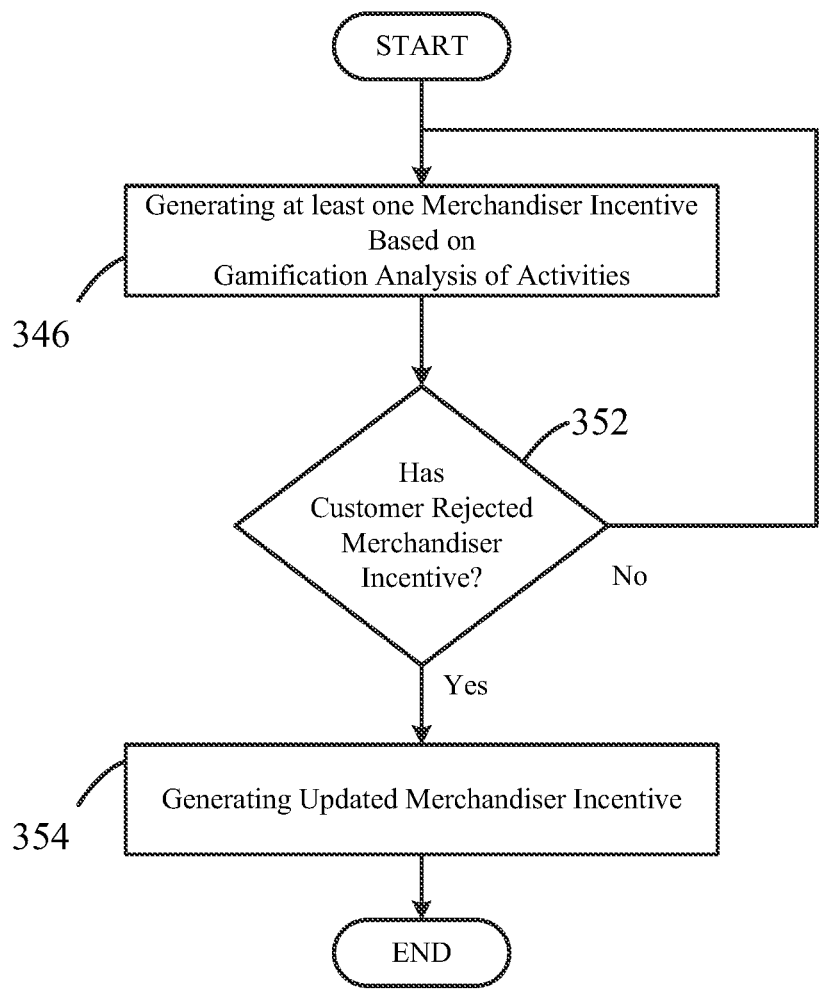

FIG. 10B is a flow chart that illustrates an example process of generating updated merchandiser incentives if a customer has rejected an original merchandiser incentive at a user interface, in accordance with embodiments. For example, at step 346, at least one merchandiser incentive may be generated based on gamification analysis of activities. After step 346, at decision 352, it may be determined if a customer has rejected a merchandiser incentive at a user interface. If at decision 348 it is determined that a customer has not rejected a merchandiser incentive at a user interface, then the process may return back to step 346. If at decision 352 it is determined that a customer has rejected a merchandiser incentive at a user interface, then the process may continue to step 354 to generate an updated merchandiser incentive. In embodiments, disclosed steps and/or decisions may be omitted, modified, include sub-steps to implement gamification analysis.

In embodiments, a method may include determining that the customer has rejected an offer included in the merchandiser incentive at a user interface. Responsive to a set of prerequisites being met, a method may generate an updated merchandiser incentive with a modified offer to be transmitted to a user interface. In embodiments, a method may transmit to a user interface of the customer the updated merchandiser incentive with the modified offer.

Figure 10C:
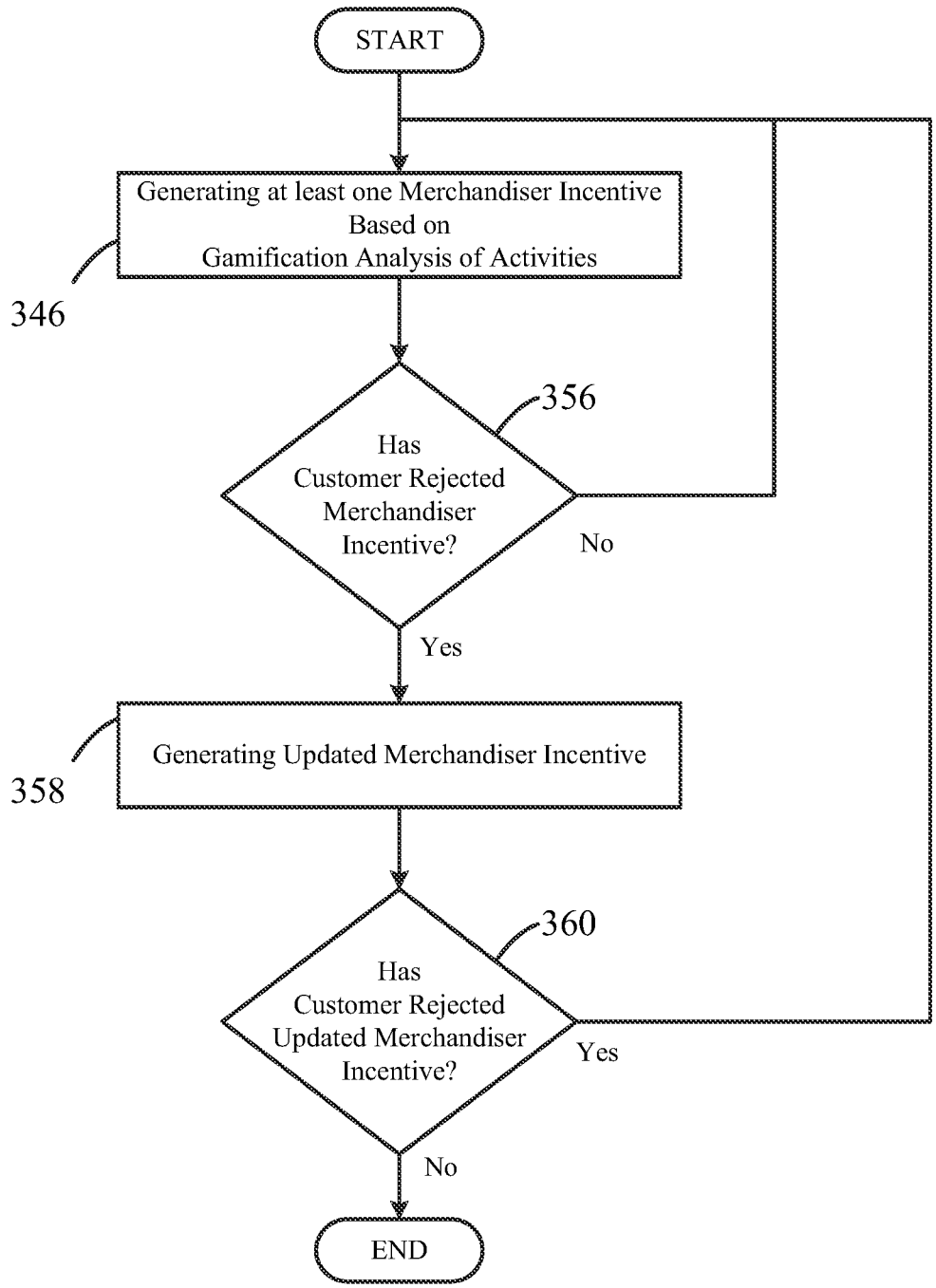
FIGS. 10C through 10E are flow charts which illustrate example processes of processing rejected updated merchandiser incentives if a customer rejects an original merchandiser incentive sent to a user interface, in accordance with embodiments.

FIG. 10C is a flow chart that illustrates an example process of generating updated merchandiser incentives if a customer has rejected an original merchandiser incentive at a user interface, in accordance with embodiments. For example, at step 346, at least one merchandiser incentive may be generated based on gamification analysis of activities. After step 346, at decision 356, it may be determined if a customer has rejected a merchandiser incentive at a user interface. Hat decision 348 it is determined that a customer has not rejected a merchandiser incentive, then the process may return back to step 346. If at decision 356 it is determined that a customer has rejected a merchandiser incentive, then the process may continue to step 358 to generate an updated merchandiser incentive to be transmitted to a user interface. After step 358, at decision 360 it may be determined if the customer has rejected an updated merchandiser incentive at a user interface. If at decision 360 it is determined that a customer has rejected an updated merchandiser incentive, then the process may proceed back to step 346. If at decision 360 it is determined that a customer has not rejected the updated merchandiser incentive, then the process may end. In embodiments, disclosed steps and/or decisions may be omitted, modified, include sub-steps to implement gamification analysis.

Figure 10D:
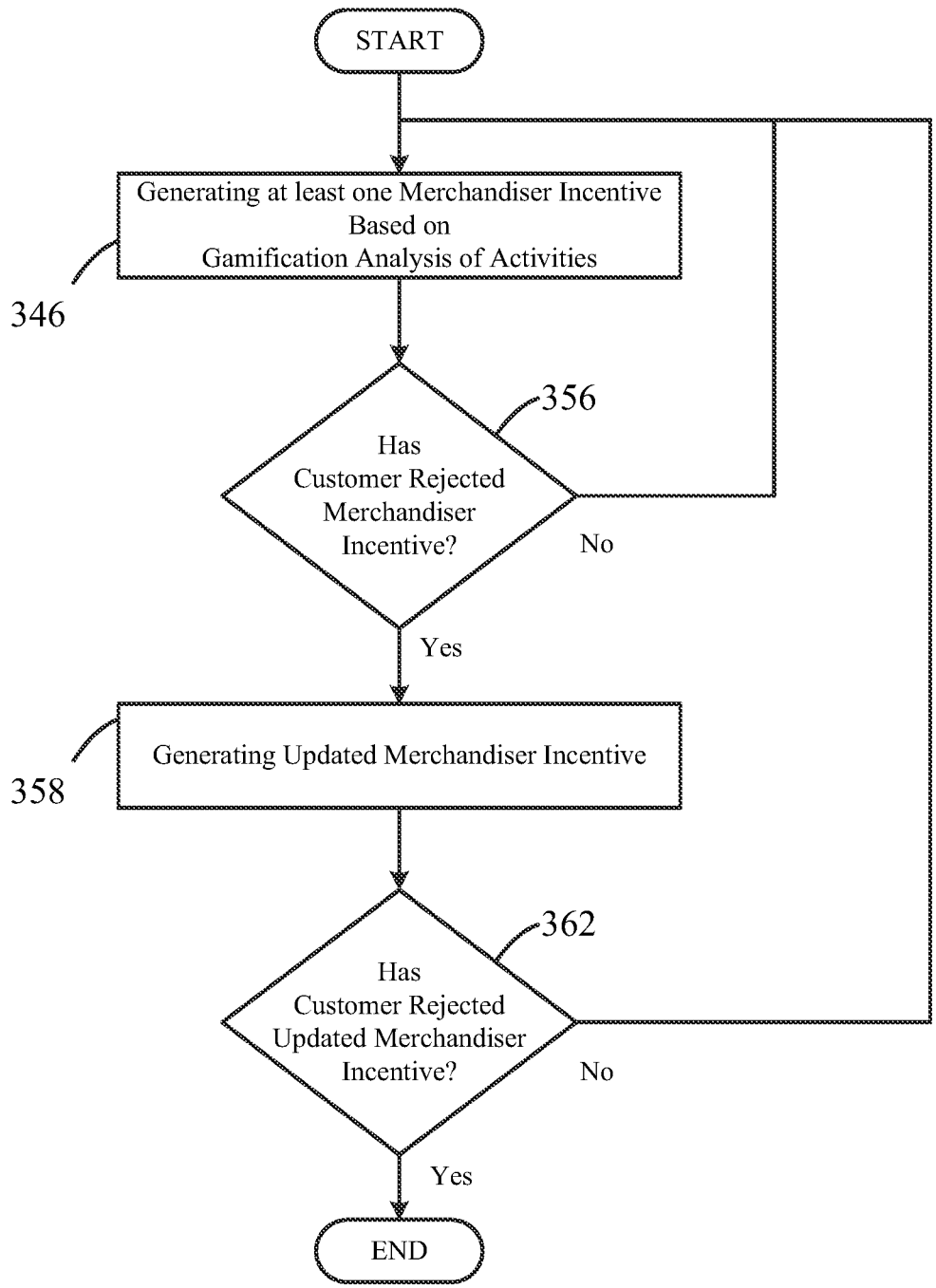

FIG. 10D is a flow chart that illustrates an example process of generating updated merchandiser incentives if a customer has rejected an original merchandiser incentive at a user interface, in accordance with embodiments. For example, at step 346, at least one merchandiser incentive may be generated based on gamification analysis of activities. After step 346, at decision 356, it may be determined if a customer has rejected a merchandiser incentive at a user interface. If at decision 348 it is determined that a customer has not rejected a merchandiser incentive at a user interface, then the process may return back to step 346. If at decision 356 it is determined that a customer has rejected a merchandiser incentive at a user interface, then the process may continue to step 358 to generate an updated merchandiser incentive. After step 358, at decision 362 it may be determined if the customer has rejected an updated merchandiser incentive at a user interface. If at decision 362 it is determined that a customer has not rejected an updated merchandiser incentive at a user interface, then the process may proceed back to step 346. If at decision 362 it is determined that a customer has rejected the updated merchandiser incentive at a user interface, then the process may end. In embodiments, disclosed step and/or decisions may be omitted, modified, include sub-steps to implement gamification analysis.

Figure 10E:
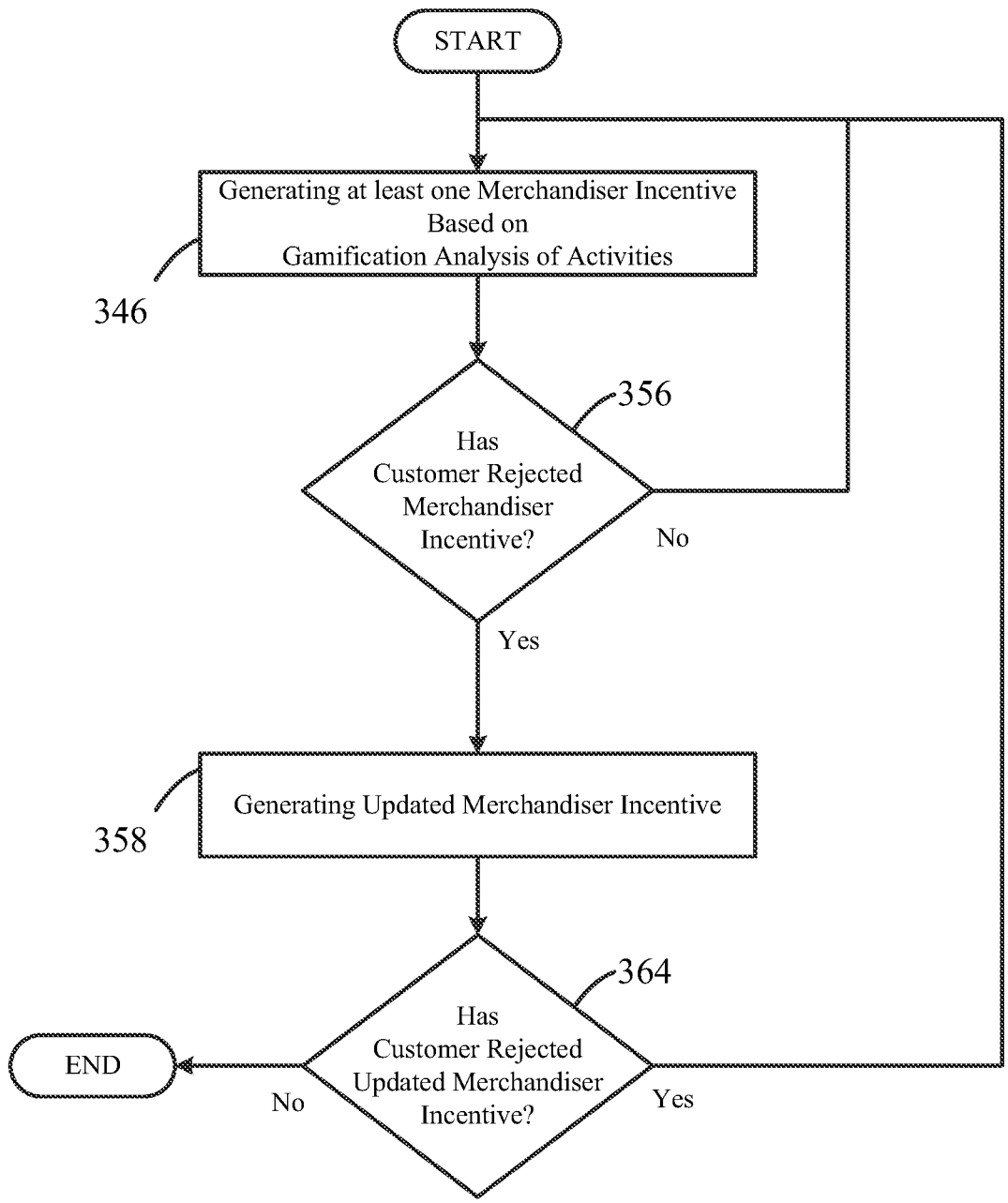

FIG. 10E is a flow chart that illustrates an example process of generating updated merchandiser incentives if a customer has rejected an original merchandiser incentive, in accordance with embodiments. For example, at step 346, at least one merchandiser incentive may be generated based on gamification analysis of activities. After step 346, at decision 356, it may be determined if a customer has rejected a merchandiser incentive. If at decision 356 it is determined that a customer has not rejected a merchandiser incentive at a user interface, then the process may return back to step 346. If at decision 356 it is determined that a customer has rejected a merchandiser incentive at a user interface, then the process may continue to step 358 to generate an updated merchandiser incentive at a user interface. After step 358, at decision 364 it may be determined if the customer has rejected an updated merchandiser incentive at a user interface. If at decision 364 it is determined that a customer has not rejected an updated merchandiser incentive at a user interface, then the process may proceed back to step 358. If at decision 364 it is determined that a customer has not rejected the updated merchandiser incentive, then the process may proceed back to step 346. In embodiments, disclosed steps and/or decisions may be omitted, modified, include sub-steps to implement gamification analysis.

Figure 11:
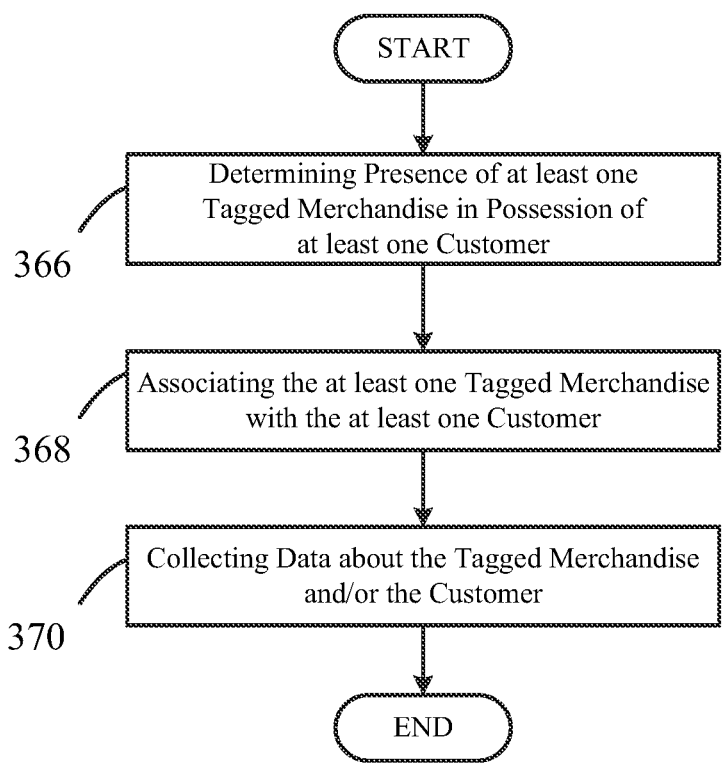
FIG. 11 is a flow chart which illustrates an example process of associating tagged merchandise with a customer, in accordance with embodiments.

FIG. 11 is a flow chart that illustrates an example process of associating tagged merchandise with a customer, in accordance with embodiments. At step 366, the presence of tagged merchandise in possession of a customer may be determined. After step 366, at step 368, the tagged merchandise may be associated with the customer. After step 368, at step 370, data about the tagged merchandise and/or the customer may be collected. In embodiments, disclosed step and/or decisions may be omitted, modified, include sub-steps to implement gamification analysis.

In embodiments, in response to a customer bringing tagged merchandise into a merchandise sampling area, recognizing the presence of the tagged merchandise in the merchandise sampling area. In embodiments, in response to the customer interacting with the tagged merchandise, associating the tagged merchandise to the at least one customer. Embodiments relate to collecting data about at least one of the customer or the tagged merchandise.

In embodiments, a merchandise sampling area is a fitting room. In embodiments, the merchandise sampling area is for at least one of clothing, footwear, accessories, jewelry, eyewear, headwear, consumer electronics, wearable electronics, and/or any other merchandise where a gamification analysis can be conducted to optimize a connection between a customer and a merchandiser.

In embodiments, a merchandise sampling area is at least one of a retail display, a provisioning center, a virtual store, a computing device, a virtual reality device, and/or any other situation, circumstance, and/or device that allows a customer to interact with an object.

In embodiments, a method collects data for gamification analysis on how long the at least one customer interacts with the at least one tagged merchandise. In embodiments, a method collects data for gamification analysis on a number of items of the at least one tagged merchandise. In embodiments, a method collects data for gamification analysis on combinations of items sampled together of the at least one tagged merchandise. In embodiments, a method collects data for gamification analysis on a number of people in the merchandise sampling area. In embodiments, a method collects data for gamification analysis on at least one category of the at least one tagged merchandise. In embodiments, a method collects data for gamification analysis on items of the at least one tagged merchandise that are sampled. In embodiments, a method collects data for gamification analysis on items of the at least one tagged merchandise that are rejected by the at least one customer. In embodiments, a method collects data for gamification analysis on items of the at least one tagged merchandise that are returned to a retail associate. In embodiments, a method collects data for gamification analysis on requests by the at least one customer for different sizes, colors, or attributes of the at least one tagged merchandise. In embodiments, a method collects data for gamification analysis on a value of the at least one tagged merchandise. In embodiments, a method collects data for gamification analysis on movement of the at least one tagged merchandise.

In embodiments, items of the at least one tagged merchandise that are sample are qualified as being sampled if the at least one customer interacts with the at least one tagged merchandise more than a predetermined amount of time.

In embodiments, at least one tagged merchandise is tracked to determine at least one of sizes, colors, or other attributes requested by the at least one customer compared to the items first brought into the merchandise sampling area.

Figure 12A:
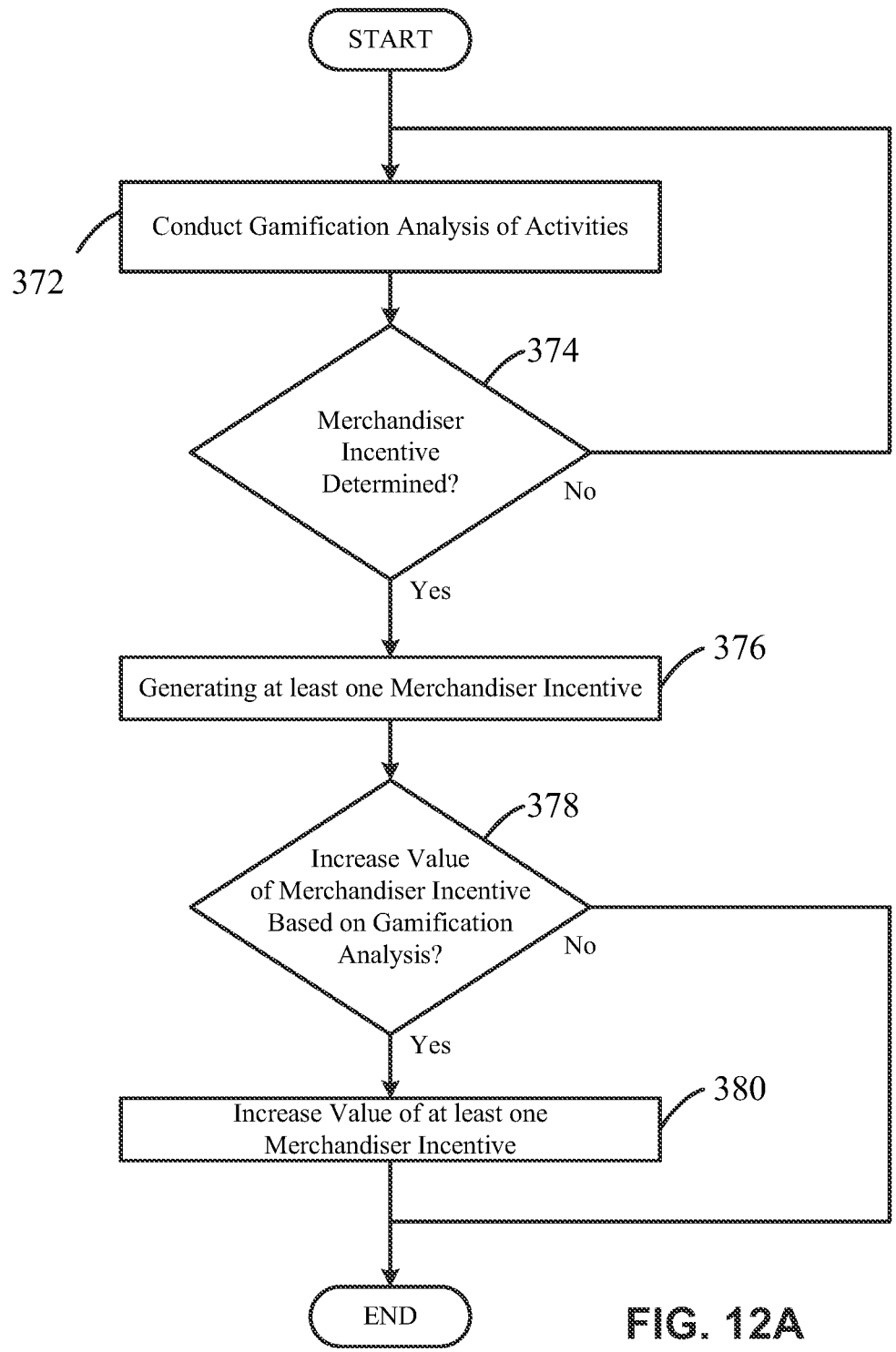
FIGS. 12A and 12B are flow charts which illustrate example processes of increasing or decreasing the value of a merchandiser incentive based on gamification analysis, in accordance with embodiments.

FIG. 12A is a flow chart that illustrates an example process of increasing the value of a merchandiser incentive based on gamification analysis, in accordance with embodiments. At step 372, gamification analysis of activities may be conducted. After step 372, at decision 374, a merchandiser incentive may be determined. If at decision 374 a merchandiser incentive has not been determined, then the process proceeds back to step 372. If at decision 374 a merchandiser incentive is determined, then the process proceeds to step 376. At step 376, at least one merchandiser incentive is generated to be transmitted to a user interface. After step 376, at decision 378, it may be determined if a value of the merchandiser incentive should be increased based on gamification analysis. If it is determined at decision 378 that a value of a merchandiser incentive should increase, then the process continues to step 380 where the value of at least one merchandiser incentive is increased. If it is determined at decision 378 that a value of a merchandiser incentive should not increase, then the process may end. In embodiments, disclosed step and/or decisions may be omitted, modified, include sub-steps to implement gamification analysis.

Figure 12B:
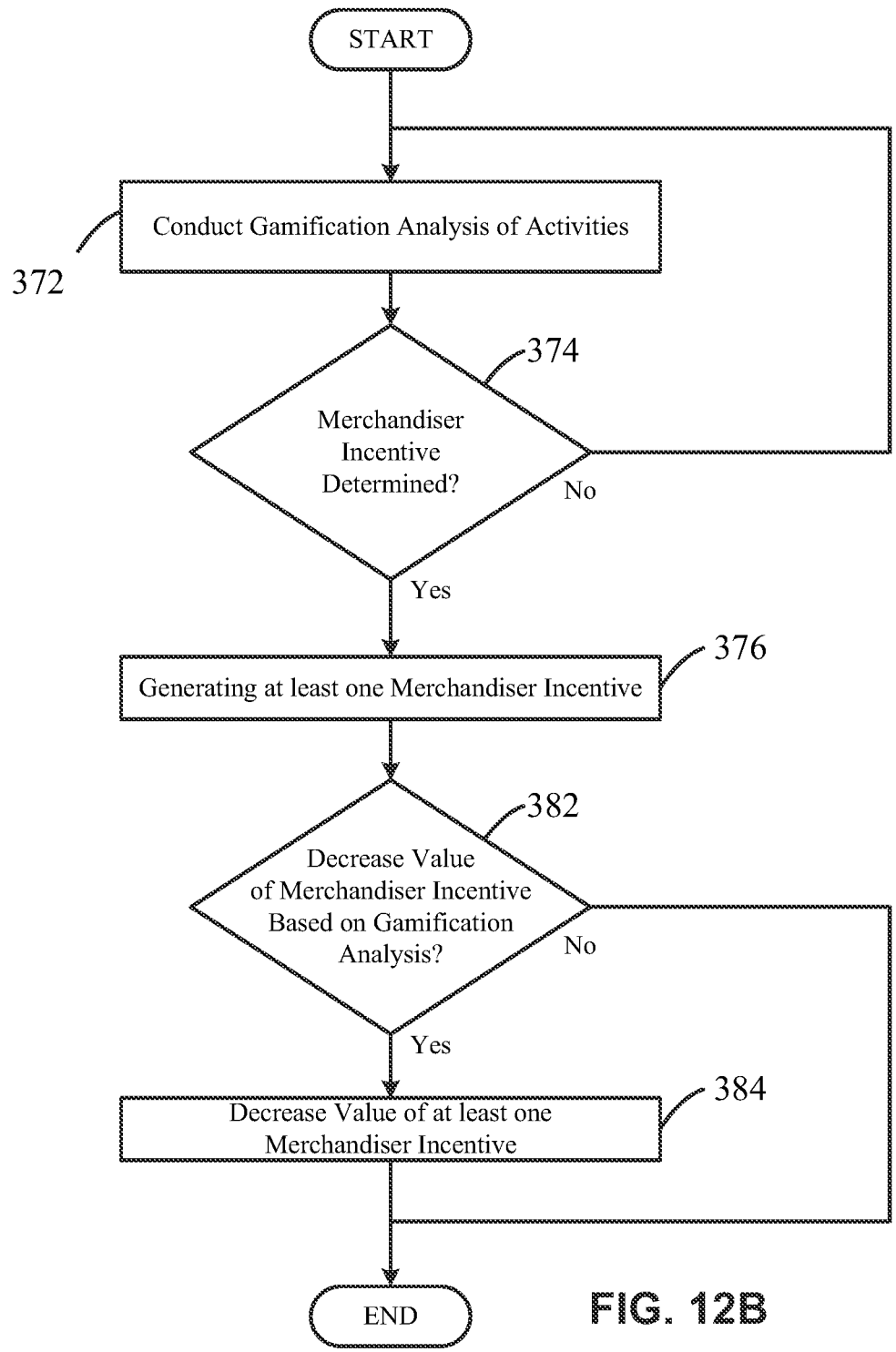

FIG. 12B is a flow chart that illustrates an example process of decreasing the value of a merchandiser incentive based on gamification analysis, in accordance with embodiments. At step 372, gamification analysis of activities may be conducted. After step 372, at decision 374, a merchandiser incentive may be determined. If at decision 374 a merchandiser incentive has not been determined, then the process proceeds back to step 372. If at decision 374 a merchandiser incentive is determined, then the process proceeds to step 376. At step 376, at least one merchandiser incentive is generated. After step 376, at decision 382, it may be determined if a value of the merchandiser incentive should be decreased based on gamification analysis. If it is determined at decision 382 that a value of a merchandiser incentive should decrease, then the process continues to step 384 where the value of at least one merchandiser incentive is decreased. If it is determined at decision 382 that a value of a merchandiser incentive should not increase, then the process may end. In embodiments, disclosed step and/or decisions may be omitted, modified, include sub-steps to implement gamification analysis.

In embodiments, a method includes providing at least one merchandiser incentive to the at least one customer at a user interface includes associating at least one sensor event of the at least one tagged merchandise with an adjustment in a promotional value of the at least one merchandiser incentive.

In embodiments, an adjustment may include increasing the promotional value in response to the at least one sensor event. In embodiments, an adjustment may include decreasing the promotional value in response to the at least one sensor event. In embodiments, an adjustment may include unlocking discounts in response to the at lease one sensor event.

In embodiments, a method may include increasing the promotional value including offering a discount to the at least one customer if the at least one customer samples a predetermined number or a dynamically determined number of items of the at least one tagged merchandise.

In embodiments, an adjustment may be based on correlation of at least one non-sensor event. In embodiments, a non-sensor event may include holidays, manufacturer discounts, position of merchandise in a season cycle, time of day, supply chain considerations, sales history, amount of time that merchandise has been in inventory, and/or any other non-sensor event that may be used in gamification analysis.

Figure 13:
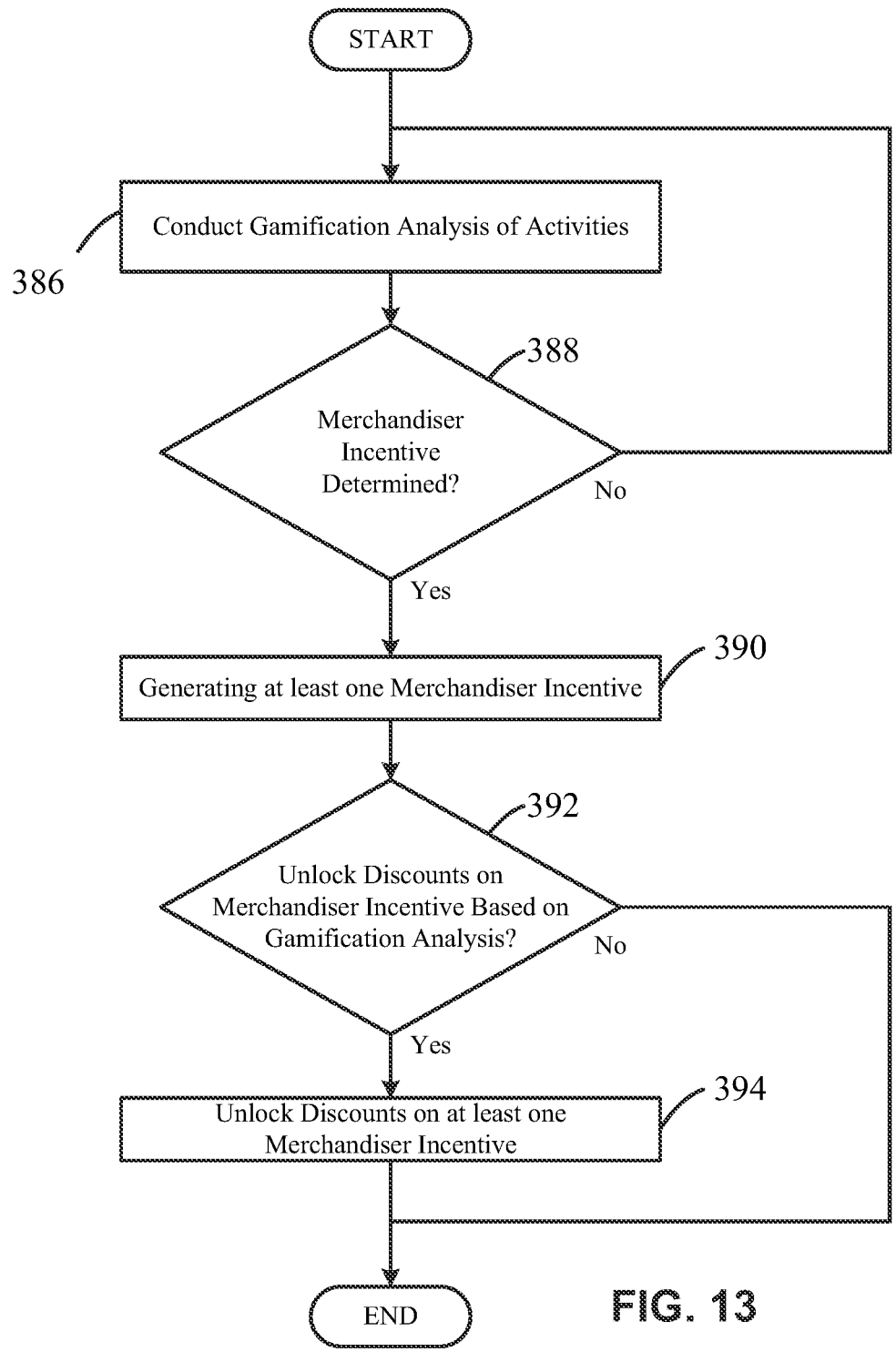
FIG. 13 is a flow chart which illustrates an example process of unlocking of discounts on a merchandiser incentive to be transmitted to a user interface based on gamification analysis, in accordance with embodiments.

FIG. 13 is a flow chart that illustrates an example process of unlocking of discounts on a merchandiser incentive based on gamification analysis, in accordance with embodiments. At step 386, gamification analysis of activities may be conducted. After step 386, at decision 388, it may be determined if a merchandiser incentive is to be generated. If at decision 388 it is determined that a merchandiser incentive is not to be generated, then the process proceeds back to step 386. If at decision 388 it is determined that the merchandiser incentive is to be generated, then the process continues to step 390 where a merchandiser incentive is generated to be sent to a user interface. After step 390, at decision 392, based on gamification analysis, it may be determined if discounts for merchandiser incentives are to be unlocked. If at decision 392 it is determined that merchandiser incentives are to be unlocked, then the process continues to step 394 where merchandiser incentives are unlocked to be sent to a user interface. If at decision 382 it is determined that merchandiser incentives are not to be unlocked, then the process may end. In embodiments, disclosed step and/or decisions may be omitted, modified, include sub-steps to implement gamification analysis.

Figure 14:
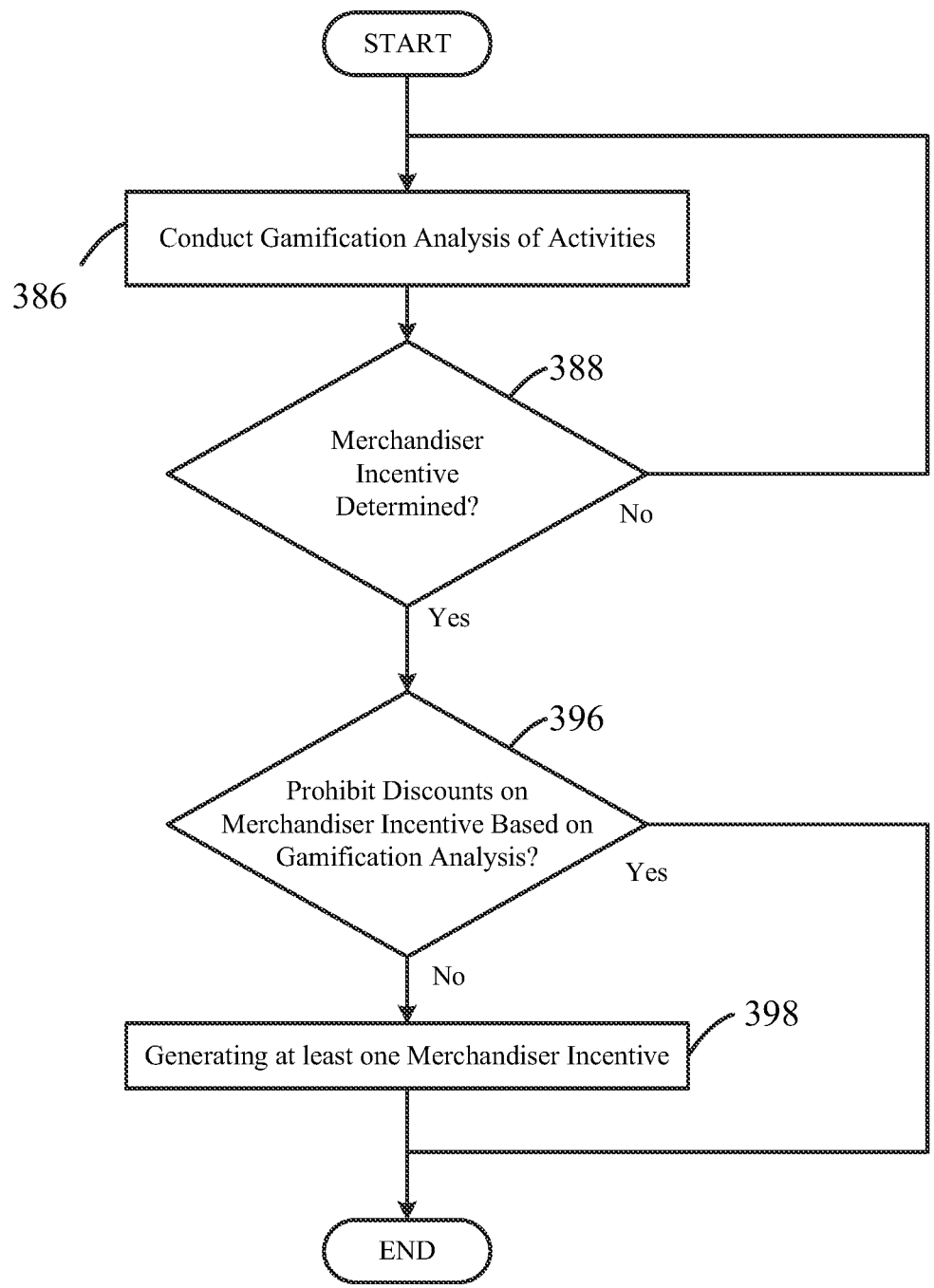
FIG. 14 is a flow chart which illustrates an example process of prohibiting discounts to be sent to a user interface based on gamification analysis, in accordance with embodiments.

FIG. 14 is a flow chart that illustrates an example process of prohibiting discounts on a merchandiser incentive based on gamification analysis, in accordance with embodiments. At step 386, gamification analysis of activities may be conducted. After step 386, at decision 388, it may be determined if a merchandiser incentive is to be generated. If at decision 388 it is determined that a merchandiser incentive is not to be generated, then the process proceeds back to step 386. If at decision 388 it is determined that the merchandiser incentive is to be generated, then the process continues to decision 396. At decision 396, it may be determined based on gamification analysis of discounts on merchandiser incentives should be prohibited from being sent to a user interface. If at decision 396 it is determined that merchandiser incentives are to be prohibited from being sent to a user interface, then the process ends. If at decision 396 it is determined that merchandiser incentives are not to be prohibited from being sent to a user interface, then the process continues to step 398 where at least one merchandiser incentive is generated. In embodiments, disclosed step and/or decisions may be omitted, modified, include sub-steps to implement gamification analysis.

In embodiments, a decreasing the promotional value comprises prohibiting discounts from being sent to a user interface if the total value of the merchandise in the merchandise is below a predetermined value or dynamically set value.

In embodiments, an unlocking of discounts comprises increasing the promotional value when a first merchandise item of the at least one tagged merchandise is sampled with a second merchandise item of the at least one tagged merchandise.

Embodiments relate to providing the at least one merchandiser incentive includes sending a notification to a user interface of a promotion to the at least one customer if the value of the at least one tagged merchandise exceeds a predetermined amount.

Figure 15:
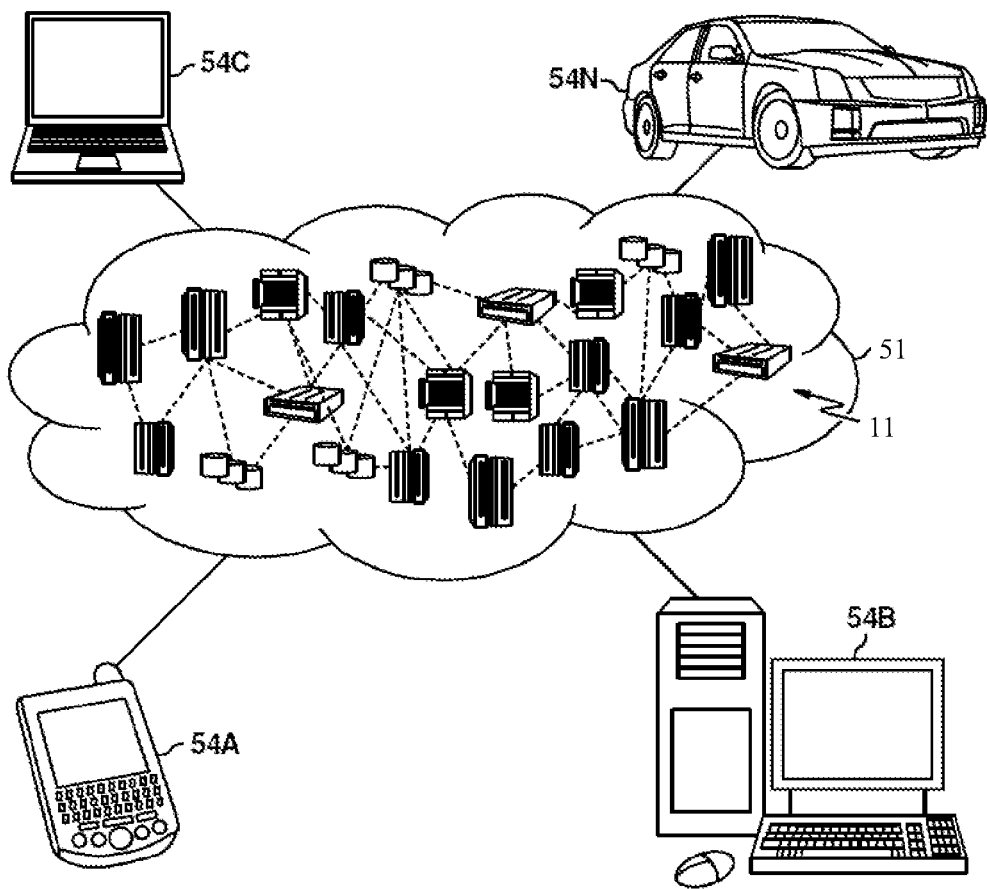
FIG. 15 depicts a cloud computing environment according to embodiments of the present invention.

FIG. 15 depicts a cloud computing environment according to embodiments of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes at network of interconnected nodes.

Referring now to FIG. 15, illustrative cloud computing environment 51 is depicted. As shown, cloud computing environment 51 includes one or more cloud computing nodes 11 with which local computing devices used by cloud consumers, such as, for example, personal digital assistant (PDA) or cellular telephone 54A, desktop computer 54B, laptop computer 54C, and/or automobile computer system 54N may communicate. Nodes 11 may communicate with one another. They may be grouped (not shown) physically or virtually, in one or more networks, such as Private, Community, Public, or Hybrid clouds as described hereinabove, or a combination thereof. This allows cloud computing environment 51 to offer infrastructure, platforms and/or software as services for which a cloud consumer does not need to maintain resources on a local computing device. It is understood that the types of computing devices 54A-N shown in FIG. 15 are intended to be illustrative only and that computing nodes 10 and cloud computing environment 51 can communicate with any type of computerized device over any type of network and/or network addressable connection (e.g., using a web browser).

Figure 16:
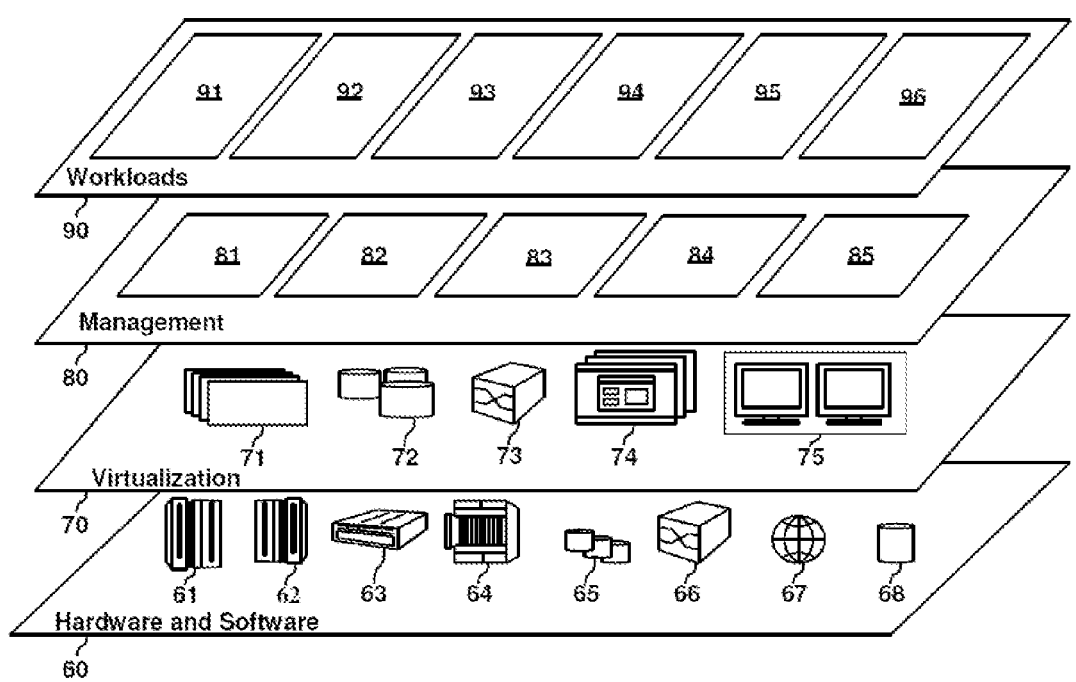
FIG. 16 depicts abstraction model layers according to embodiments of the present invention.

Referring now to FIG. 16, a set of functional abstraction layers provided by cloud computing environment 51 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating at least one merchandiser incentive based on gamification analysis of the activities of at least one customer 96.

Figure 17:
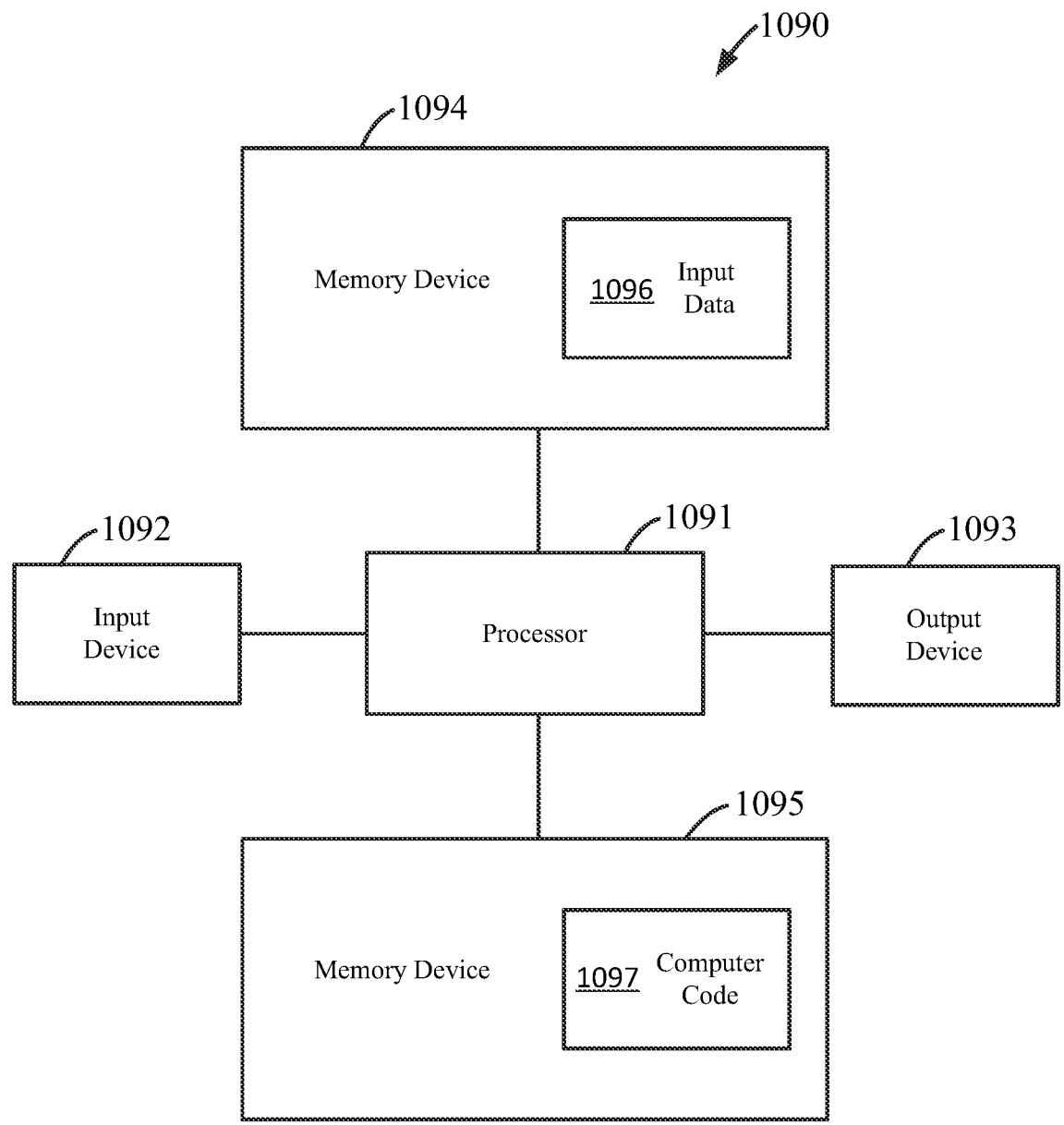
FIG. 17 illustrates a computer system used for implementing the methods associated with embodiments of the present invention.

FIG. 17 illustrates a computer system 1090 used for implementing the methods of the present invention. The computer system 1090 includes a processor 1091, an input device 1092 coupled to the processor 1091, an output device 1093 coupled to the processor 1091, and memory devices 1094 and 1095 each coupled to the processor 1091. The input device 1092 may be, inter alia, a keyboard, a mouse, etc. The output device 1093 may be, inter alia, a printer, a plotter, a computer screen, a magnetic tape, a removable hard disk, a floppy disk, etc. The memory devices 1094 and 1095 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 1095 includes a computer code 1097 which is a computer program that includes computer-executable instructions. The computer code 1097 includes software or program instructions that may implement an algorithm for implementing methods of embodiments of the present invention. The processor 1091 executes the computer code 1097. The memory device 1094 includes input data 1096. The input data 1096 includes input required by the computer code 1097, The output device 1093 displays output from the computer code 1097. Either or both memory devices 1094 and 1095 (or one or more additional memory devices not shown in FIG. 17) may be used as a computer usable storage medium (or program storage device) having a computer readable program embodied therein and/or having other data stored therein, wherein the computer readable program includes the computer code 1097. Generally, a computer program product (or, alternatively, an article of manufacture) of the computer system 1090 may include the computer usable storage medium (or said program storage device).

The processor 1091 may represent one or more processors. The memory device 1094 and/or the memory device 1095 may represent one or more computer readable hardware storage devices and/or one or more memories.

Thus embodiments of the present invention discloses a process for supporting, deploying and/or integrating computer infrastructure, integrating, hosting, maintaining, and deploying computer-readable code into the computer system 1090, wherein the code in combination with the computer system 1090 is capable of implementing the methods of embodiments of the present invention.

While FIG. 17 shows the computer system 1090 as a particular configuration of hardware and software, any configuration of hardware and software, as would be known to a person of ordinary skill in the art, may be utilized for the purposes stated supra in conjunction with the particular computer system 1090 of FIG. 17. For example, the memory devices 1094 and 1095 may be portions of a single memory device rather than separate memory devices.

The present invention may be a system a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The flowchart and block diagrams in the Figures illustrate the architecture, functionality, and operation of possible implementations of systems, methods, and computer program products according to various embodiments of the present invention. In this regard each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of embodiments may include one or more computer readable hardware storage devices having computer readable program code stored therein, said program code containing instructions executable by one or more processors of a computing system (or computer system) to implement the methods of the present invention.

A computing system (or computer system) of embodiments may include one or more processors, one or more memories, and one or more computer readable hardware storage devices, said one or more hardware storage devices containing program code executable by the one or more processors via the one or more memories to implement the methods of embodiments.

In embodiments, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

In embodiments, predicting resource availability in a given time period by leveraging profile data may be implemented using special purpose algorithms. For example, a special purpose algorithm may be implemented to analyze historical user of a resource, determine that factors are predictors of use of the resource by users, and/or predicting that there is a statistical likelihood that one or more users will use the resource during a period of time.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by an IoT server over a network from a first sensor among a plurality of sensors, merchandise identification data that is sensed by the first sensor and identifies a merchandise item with which a customer is presently interacting, wherein said first sensor is incorporated on a first Internet-of-Things (IoT) device paired with the merchandise item among a plurality of IoT devices coupled to the IoT server via the network, wherein the plurality of sensors is incorporated on the plurality of IoT devices, respectively;
receiving, by the IoT server over the network from a second sensor of the plurality of sensors, customer behavior data that is sensed by the second sensor and identifies a behavior exhibited by the customer while interacting with the merchandise item, wherein the second sensor is incorporated on a second IoT device among the plurality of IoT devices;
receiving, by the IoT server over the network from a third sensor of the plurality of sensors, customer interaction data that is sensed by the third sensor and identifies an interaction of the customer with the merchandise item, wherein the sensed interaction of the customer is indicative of positive customer reaction to the merchandise item, wherein the third sensor is incorporated on a third IoT device among the plurality of IoT devices;
performing, by the IoT server, a gamification analysis, based on the sensed customer behavior data and the sensed customer interaction data that are received from the second sensor and the third sensor, to determine a purchase incentive for communication to the customer that is intended to incentivize purchase of the merchandise item by the customer, wherein the purchase incentive requires at least one task to be performed by the customer for the customer to accept the purchase incentive; and
transmitting, by the IoT server over the network, the purchase incentive to a user device associated with the customer,
wherein the performing the gamification analysis includes analyzing the sensed customer behavior data and the sensed customer interaction data by applying at least one from among game-design elements, game principles, and a player centered design in a non-game context to determine the purchase incentive.

2. The method of claim 1, wherein the received customer behavior data represents at least one from among (i) vocal expressions, (ii) facial expressions, and (iii) body language of the customer with respect to the merchandise item.

3. The method of claim 1, wherein the customer interaction data represents at least one from among (i) a length of time of the interaction between the customer and the merchandise item, (ii) a number of the merchandise item in contact with the customer, and (iii) a type of the interaction between the customer and the merchandise item.

4. The method of claim 1, further comprising:
receiving, from a fourth sensor, merchandise identification data identifying a second merchandise item in contact with the customer; and
adjusting the purchase incentive based on a combination of the merchandise item and the second merchandise item.

5. The method of claim 1, further comprising:
receiving merchandise information associated with the merchandise item, the merchandise information including at least one from among (i) a value of the merchandise item, (ii) a category of the merchandise item, (iii) sales history of the merchandise item, (iv) a manufacturer discount of the merchandise item, (v) popularity of the merchandise item, (vi) an amount of time that the merchandise item has been in inventory, (vii) a position of the merchandise item in a season cycle, and (viii) supply chain information; and
adjusting the purchase incentive based on the received merchandise information.

6. The method of claim 1, further comprising:
in response to receipt of data indicating a rejection of the purchase incentive by the customer, adjusting a value of the purchase incentive and transmitting data indicative of the adjusted value purchase incentive to the customer.

7. The method of claim 1, wherein the purchase incentive is transmitted to the user device associated with the customer at a predesignated time.

8. A non-transitory computer-readable storage medium comprising computer-readable instructions, which when executed by a computing system, cause the computing system to:
receive, by an IoT server over a network from a first sensor among a plurality of sensors, merchandise identification data that is sensed by the first sensor and identifies a merchandise item with which a customer is presently interacting, wherein said first sensor is incorporated on a first Internet-of-Things (IoT) device paired with the merchandise item among a plurality of IoT devices coupled to the IoT server via the network, wherein the plurality of sensors is incorporated on the plurality of IoT devices, respectively;
receive, by the IoT server over the network from a second sensor of the plurality of sensors, customer behavior data that is sensed by the second sensor and identifies a behavior exhibited by the customer while interacting with the merchandise item, wherein the second sensor is incorporated on a second IoT device among the plurality of IoT devices;
receive, by the IoT server over the network from a third sensor of the plurality of sensors, customer interaction data that is sensed by the third sensor and identifies an interaction of the customer with the merchandise item, wherein the sensed interaction of the customer is indicative of positive customer reaction to the merchandise item, wherein the third sensor is incorporated on a third IoT device among the plurality of IoT devices;
perform, by the IoT server, a gamification analysis, based on the sensed customer behavior data and the sensed customer interaction data that are received from the second sensor and the third sensor, to determine a purchase incentive for communication to the customer that is intended to incentivize purchase of the merchandise item by the customer, wherein the purchase incentive requires at least one task to be performed by the customer for the customer to accept the purchase incentive; and
transmit, by the IoT server over the network, the purchase incentive to a user device associated with the customer,
wherein the performing the gamification analysis includes analyzing the sensed customer behavior data and the sensed customer interaction data by applying at least one from among game-design elements, game principles, and a player centered design in a non-game context to determine the purchase incentive.

9. The non-transitory computer-readable storage medium of claim 8, wherein the received customer behavior data represents at least one from among (i) vocal expressions, (ii) facial expressions, and (iii) body language of the customer with respect to the merchandise item.

10. The non-transitory computer-readable storage medium of claim 8, wherein the customer interaction data represents at least one from among (i) a length of time of the interaction between the customer and the merchandise item, (ii) a number of the merchandise item in contact with the customer, and (iii) a type of the interaction between the customer and the merchandise item.

11. The non-transitory computer-readable storage medium of claim 8, wherein the computer-readable instructions, when executed by the computing system, further cause the computing system to:
receive, from a fourth sensor, merchandise identification data identifying a second merchandise item in contact with the customer; and
adjust the purchase incentive based on a combination of the merchandise item and the second merchandise item.

12. The non-transitory computer-readable storage medium of claim 8, wherein the computer-readable instructions, which when executed by the computing system, further cause the computing system to:
receive merchandise information associated with the merchandise item, the merchandise information including at least one from among (i) a value of the merchandise item, (ii) a category of the merchandise item, (iii) sales history of the merchandise item, (iv) a manufacturer discount of the merchandise item, (v) popularity of the merchandise item, (vi) an amount of time that the merchandise item has been in inventory, (vii) a position of the merchandise item in a season cycle, and (viii) supply chain information; and
adjust the purchase incentive based on the merchandise information.

13. The non-transitory computer-readable storage medium of claim 8, wherein the computer-readable instructions, when executed by the computing system, further cause the computing system to:
in response to receipt of data indicating a rejection of the purchase incentive by the customer, adjust a value of the purchase incentive and transmit data indicative of the adjusted value purchase incentive to the customer.

14. The non-transitory computer-readable storage medium of claim 8, wherein the purchase incentive is transmitted to the user device associated with the customer at a predesignated time.

15. A system comprising:
one or more processors; and
a computer-readable medium comprising instructions stored therein, which when executed by the one or more processors, cause the one or more processors to:
receive, by an IoT server over a network from a first sensor among a plurality of sensors, merchandise identification data that is sensed by the first sensor and identifies a merchandise item with which a customer is presently interacting, wherein said first sensor is incorporated on a first Internet-of-Things (IoT) device paired with the merchandise item among a plurality of IoT devices coupled to the IoT server via the network, wherein the plurality of sensors is incorporated on the plurality of IoT devices, respectively;

receive, by the IoT server over the network from a second sensor of the plurality of sensors, customer behavior data that is sensed by the second sensor and identifies a behavior exhibited by the customer while interacting with the merchandise item, wherein the second sensor is incorporated on a second IoT device among the plurality of IoT devices;

receive, by the IoT server over the network from a third sensor of the plurality of sensors, customer interaction data that is sensed by the third sensor and identifies an interaction of the customer with the merchandise item, wherein the sensed interaction of the customer is indicative of positive customer reaction to the merchandise item, wherein the third sensor is incorporated on a third IoT device among the plurality of IoT devices;

perform, by the IoT server, a gamification analysis, based on the sensed customer behavior data and the sensed customer interaction data that are received from the second sensor and the third sensor, to determine a purchase incentive for communication to the customer that is intended to incentivize purchase of the merchandise item by the customer, wherein the purchase incentive requires at least one task to be performed by the customer for the customer to accept the purchase incentive; and transmit, by the IoT server over the network, the purchase incentive to a user device associated with the customer, wherein the performing the gamification analysis includes analyzing the sensed customer behavior data and the sensed customer interaction data by applying at least one from among game-design elements, game principles, and a player centered design in a non-game context to determine the purchase incentive.

16. The system of claim 15, wherein the received customer behavior data represents at least one from among (i) vocal expressions, (ii) facial expressions, and (iii) body language of the customer with respect to the merchandise item.

17. The system of claim 15, wherein the customer interaction data represents at least one from among (i) a length of time of the interaction between the customer and the merchandise item, (ii) a number of the merchandise item in contact with the customer, and (iii) a type of the interaction between the customer and the merchandise item.

18. The system of claim 15, wherein the instructions, when executed by the one or more processors, further cause the one or more processors to:

receive, from a fourth sensor, merchandise identification data identifying a second merchandise item in contact with the customer; and adjust the purchase incentive based on a combination of the merchandise item and the second merchandise item.

19. The system of claim 15, wherein the instructions, when executed by the one or more processors, further cause the one or more processors to:

receive merchandise information associated with the merchandise item, the merchandise information including at least one from among (i) a value of the merchandise item, (ii) a category of the merchandise item, (iii) sales history of the merchandise item, (iv) a manufacturer discount of the merchandise item, (v) popularity of the merchandise item, (vi) an amount of time that the merchandise item has been in inventory, (vii) a position of the merchandise item in a season cycle, and (viii) supply chain information; and adjust the purchase incentive based on the merchandise information.

20. The system of claim 15, wherein the instructions, which when executed by the one or more processors, further cause the one or more processors to:

in response to receipt of data indicating a rejection of the purchase incentive by the customer, adjust a value of the purchase incentive and transmit data indicative of the adjusted value purchase incentive to the customer.

* * * * *

UNITED STATES PATENT AND TRADEMARK OFFICE
CERTIFICATE OF CORRECTION

| | |
|---|---|
| PATENT NO. | : 11,790,387 B2 |
| APPLICATION NO. | : 17/833154 |
| DATED | : October 17, 2023 |
| INVENTOR(S) | : Lisa Seacat DeLuca |

It is certified that error appears in the above-identified patent and that said Letters Patent is hereby corrected as shown below:

In the Claims

In Column 25, Line 20, Claim 5, delete "received"

In Column 26, Line 35, Claim 12, delete "which"

In Column 28, Line 35, Claim 20, delete "which"

Signed and Sealed this
Twenty-first Day of November, 2023

*Katherine Kelly Vidal*

Katherine Kelly Vidal
*Director of the United States Patent and Trademark Office*